(12) United States Patent
Dalla-Torre et al.

(10) Patent No.: US 8,977,035 B2
(45) Date of Patent: Mar. 10, 2015

(54) SYSTEM, METHOD AND COMPUTER PROGRAM PRODUCT FOR DETECTION OF DEFECTS WITHIN INSPECTION IMAGES

(75) Inventors: Michele Dalla-Torre, Givataim (IL); Gil Shabat, Raanana (IL); Adi Dafni, Kibbutz Givat Brener (IL); Amit Batikoff, Petach Tikva (IL)

(73) Assignee: Applied Materials Israel, Ltd., Rehovot (IL)

(*) Notice: Subject to any disclaimer, the term of this patent is extended or adjusted under 35 U.S.C. 154(b) by 252 days.

(21) Appl. No.: 13/517,520

(22) Filed: Jun. 13, 2012

(65) Prior Publication Data
US 2013/0336575 A1   Dec. 19, 2013

(51) Int. Cl.
*G06K 9/00* (2006.01)

(52) U.S. Cl.
USPC ......................................................... 382/149

(58) Field of Classification Search
USPC ......................................................... 382/149
See application file for complete search history.

(56) References Cited

U.S. PATENT DOCUMENTS

| | | | | |
|---|---|---|---|---|
| 4,928,313 A * | 5/1990 | Leonard et al. | ............... | 382/149 |
| 7,565,633 B2 * | 7/2009 | Mukherjee et al. | ........... | 716/106 |
| 8,041,104 B2 * | 10/2011 | Toyoda et al. | ............... | 382/145 |
| 8,131,059 B2 * | 3/2012 | Taguchi et al. | ............... | 382/149 |
| 2002/0122990 A1 * | 9/2002 | Inoue | .............................. | 430/5 |
| 2006/0050267 A1 * | 3/2006 | Murakami et al. | ......... | 356/237.2 |
| 2009/0041332 A1 * | 2/2009 | Bhaskar et al. | ............... | 382/145 |
| 2011/0013825 A1 * | 1/2011 | Shibuya et al. | ............... | 382/149 |
| 2013/0016895 A1 * | 1/2013 | Song et al. | .................... | 382/149 |

* cited by examiner

*Primary Examiner* — Stephen R Koziol
*Assistant Examiner* — Totam Le
(74) *Attorney, Agent, or Firm* — Lowenstein Sandler LLP

(57) ABSTRACT

An analysis system for detection of defects within an inspection image of an inspected object, the inspection image comprising a plurality of pixels, the system including: a computerized segmentation module configured to segmentize the inspection image based on multiple anchor locations and on a mask which defines multiple mask-segments, by assigning each part out of multiple parts of the inspection image to a respective image-segment selected out of a multiple image segments, wherein the multiple image segments correspond to at least one mask-segment of said multiple mask-segments; and a defect detection processor configured to determine a presence of a defect in the inspection image based on the segmentation at least by assessing each pixel out of a plurality of pixels of the inspection image.

19 Claims, 11 Drawing Sheets

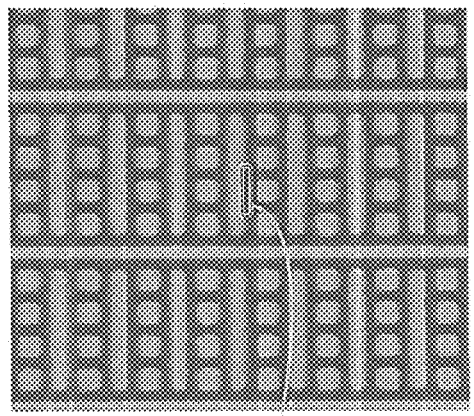 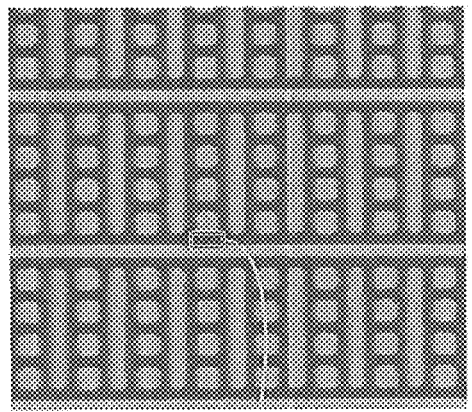
10a — Edge roughness   10b — Short Gate defect
FIG. 1A
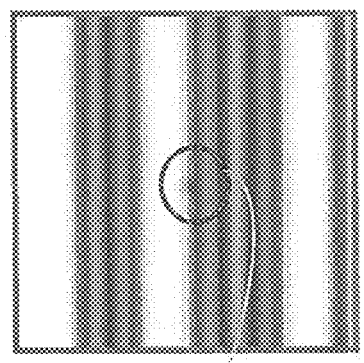 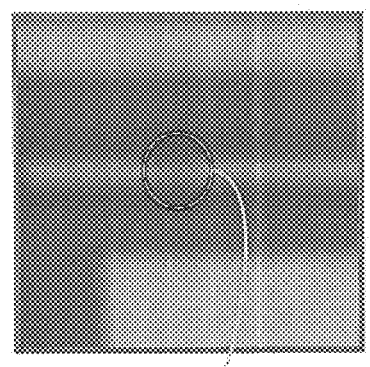
10c — Edge roughness   10d — Short Gate defect
FIG. 1B

US 8,977,035 B2

SYSTEM, METHOD AND COMPUTER PROGRAM PRODUCT FOR DETECTION OF DEFECTS WITHIN INSPECTION IMAGES

BACKGROUND OF THE INVENTION

In many implementations, inspected objects are imaged and are inspected thereafter to discover target patterns. For example, aerial images may be inspected for enemy tanks, textile fabric imaged during manufacture may be inspected for holes, and electronic circuits, such as wafers, may be imaged and inspected for defects.

Taking the case of defects searched during manufacture of wafers as an example, it is clear that while defects can damage the proper operability of an electronic circuit, impact of different defects on the operation of the electronic circuit may vary. Therefore, some defects may be of no substantial interest to the inspecting party, e.g. if their impact on circuit operation is low. Furthermore, knowledge regarding different defects may be useful for manufacturing of future similar electronic circuits.

FIGS. 1A and 1B illustrate two types of defects in an electronic circuit, wherein each of FIGS. 1A and 1B illustrates an electronic circuit (such as a wafer), scanned using electron beam inspection. The grey level in each one of the circuits illustrated in FIGS. 1A and 1B is indicative of the pattern of the electronic circuit in that part of the wafer. For example, materials of different conductivity (such as a conducting material and an isolating material) may have different reflection indexes which may be translated to different grey levels. The following discussion pertains to an example in which substantially different grey level values in the image are indicative of different materials of substantially different electrical conductivity.

Defects 10a and 10c (also denoted "edge roughness" defects) are located on the boundary of an area of the imaged layer of the wafer between two different materials. Therefore, the electronic effect of such a defect is relatively limited, and under some circumstances such a defect may be of little interest.

Defects 10b and 10d, on the other hand (also denoted "short gate" defects), are located between two areas of the imaged layer of similar materials, and may indicate a conductive connection between two parts of the electronic circuits which ought to be isolated from each other. Since the electronic effects of such a defect may be relatively significant, under some circumstances such a defect may be further inspected—e.g. in a higher inspection resolution and/or using slower and more in-depth image analysis.

SUMMARY OF THE INVENTION

According to an aspect of the invention, an analysis system for detection of defects within an inspection image of an inspected object, the inspection image including a plurality of pixels is disclosed. The system includes:
- a computerized anchor processing module configured to compute multiple anchor locations with respect to the inspection image, based on a matching of a template to multiple portions of the inspection image;
- a computerized segmentation module operatively connected to the computerized anchor processing module, configured to segmentize the inspection image based on the multiple anchor locations and on a mask which defines multiple mask-segments, by assigning each pixel out of multiple pixels of the inspection image to a respective image-segment selected out of a multiple image segments, wherein the multiple image segments correspond to at least one mask-segment of said multiple mask-segments; and
- a defect detection processor operatively connected to the computerized segmentation module, configured to determine a presence of a defect in the inspection image based on the segmentation at least by: (i) comparing the inspection image to a second inspection image for calculating differences between corresponding pixels of the inspection images, and (ii) for each pixel out of a plurality of pixels of the inspection image, assessing the pixel based on: (a) a result of a comparison of the pixel to correlative data of a reference image, and (b) a decision rule which depends on the image-segment selected for the pixel.

According to an aspect of the invention, a more general analysis system for detection of defects within an inspection image of an inspected object, the inspection image including a plurality of pixels is disclosed. That system includes:
- a computerized anchor processing module configured to obtain multiple anchor locations with respect to the inspection image;
- a computerized segmentation module operatively connected to the computerized anchor processing module, configured to segmentize the inspection image based on the multiple anchor locations and on a mask which defines multiple mask-segments, by assigning each part out of multiple parts of the inspection image to a respective image-segment selected out of a multiple image segments, wherein the multiple image segments correspond to at least one mask-segment of said multiple mask-segments; and
- a defect detection processor operatively connected to the computerized segmentation module, configured to determine a presence of a defect in the inspection image based on the segmentation at least by assessing each pixel out of a plurality of pixels of the inspection image based on: (a) a result of a comparison of the pixel to correlative data of a reference image, and (b) a decision rule which depends on the image-segment selected for the pixel.

Optionally, at least two of the portions are at least partly overlapping.

Optionally, the anchor processing module may be configured to compute the multiple anchor locations based on a matching of a template to multiple portions of the inspection image.

Optionally, the system may further include a reference data generator configured to downsample at least a part of a reference image of an inspected-object reference area, and to generate the template based on a result of the downsampling.

Optionally, the reference data generator may be further configured to define the mask based on the reference image Optionally, the system may further include a reference data generator which is configured to generate the mask by processing a reference image which is generated from computer-aided design (CAD) data.

Optionally, the system may further include a reference data generator which is configured to generate the mask by processing a reference image which is generated from CAD data.

Optionally, the inspected object is selected from a group consisting of an electronic circuit, a wafer, and a photomask.

Optionally, the anchor processing module may be configured to compute the anchor locations at an accuracy which exceeds a resolution of the inspection image.

Optionally, the processor may be further configured to define different detection schemes to different areas of the inspection image based on the segmentation of at least the part of the inspection image; wherein the defect detection processor is configured to determine the presence of the defect based on a result of the defining.

Optionally, the system may further include a distribution analysis module configured to determine for each our of a plurality of pixels of the inspection image a distribution of the pixel with respect to one or more of the plurality of mask-segments; wherein the computerized segmentation module is configured to assign parts of the multiple parts to one or more of the image segments based on the distributions determined for the plurality of pixels.

Optionally, the system may further include a distribution analysis module which is configured to determine, based on a defect-detection mask which defines different defect-detection segments and on a location determined with respect to the inspection image, a defect-detection distribution of a potential defect with respect to one or more of the defect-detection segments; wherein the defect detection processor includes a classifier, configured to classify the potential defect based on the defect-detection distribution.

Optionally, the system may further include a distribution analysis module that is configured to determine a distribution of a potential defect with respect to one or more mask-segments at an accuracy which exceeds the resolution of the inspection image; wherein the defect detection processor is configured to classify the potential defect based on the distribution.

Optionally, the defect detection processor may be configured to classify the potential defect based on a selection of one or more image-segments to which one or more parts of the inspection image which are correlative to the potential defect where assigned, according to a classification in which classes correspond to defect types whose implications on an operability of the inspected object differ.

Optionally, the system may further include a sensor that is configured to inspect the inspection object and to provide the inspection image based on the inspection.

According to an aspect of the invention, a computerized method for detection of defects within an inspection image of an inspected wafer, the image including a plurality of pixels, is disclosed. The method includes:

computing multiple anchor locations with respect to the inspection image, based on a matching of a template to multiple portions of the inspection image;

based on the multiple anchor locations and on a mask which defines multiple mask-segments, segmentizing the inspection image by assigning each pixel out of multiple pixels of the image to a respective image-segment selected out of a multiple image-segments, wherein the multiple image-segments correspond to at least one mask-segment of said multiple mask-segments; and determining a presence of a defect in the inspection image based on the segmentation, the determining of the presence of the defect includes: (i) comparing the inspection image to a second inspection image for calculating differences between corresponding pixels of the inspection images, and (ii) for each pixel out of a plurality of pixels of the inspection image, assessing the pixel based on: (a) a result of a comparison of the pixel to correlative data of a reference image, and (b) a decision rule which depends on the image-segment selected for the pixel.

According to an aspect of the invention, a more general computerized method for detection of defects within an inspection image of an inspected object, the image including a plurality of pixels is disclosed. This method includes:

obtaining multiple anchor locations with respect to the inspection image;

based on the multiple anchor locations and on a mask which defines multiple mask-segments, segmentizing the inspection image by assigning each part out of multiple parts of the inspection image to a respective image-segment selected out of a multiple image-segments, wherein the multiple image-segments correspond to at least one mask-segment of said multiple mask-segments; and determining a presence of a defect in the inspection image based on the segmentation, the determining of the presence of the defect includes: for each pixel out of a plurality of pixels of the inspection image, assessing the pixel based on: (a) a result of a comparison of the pixel to correlative data of a reference image, and (b) a decision rule which depends on the image-segment selected for the pixel.

Optionally, the obtaining may include computing the multiple anchor locations based on a matching of a template to multiple portions of the inspection image.

Optionally, the method may further include generating the template, wherein the generating includes downsampling at least a part of a reference image of an inspected-object reference area Optionally, the mask may be determined based on the reference image Optionally, the method may further include generating the template by processing a reference image which is generated from CAD data.

Optionally, the inspected object is selected from a group consisting of an electronic circuit, a wafer, and a photomask.

Optionally, an accuracy of the computing of the anchor locations exceeds a resolution of the inspection image.

Optionally, at least two of the portions are at least partly overlapping.

Optionally, the method may further include generating the mask by processing a reference image which is generated from CAD data.

Optionally, the determining of the presence of the defect is based on different detection schemes defined for different areas of the inspection image, wherein the defining is based on the segmentation.

Optionally, the method may include determining a distribution of each out of a plurality of pixels of the inspection image with respect to one or more of the plurality of mask-segments; wherein the segmentizing is based on the distributions determined for the plurality of pixels.

Optionally, the determining of the presence of the defect includes: (a) based on a defect-detection mask which defines different defect-detection segments and on a location determined with respect to the inspection image, determining a defect-detection distribution of a potential defect with respect to one or more of the defect-detection segments; and (b) classifying the potential defect based on the defect-detection distribution.

Optionally, the determining of the presence of the defect includes determining a distribution of a potential defect with respect to one or more mask-segments at an accuracy which exceeds the resolution of the inspection image; and classifying the potential defect based on the distribution.

Optionally, the determining of the presence of the defect includes classifying the potential defect based on a selection of one or more image-segments to which one or more parts of the inspection image which are correlative to the potential defect where assigned, wherein the classifying includes classifying the potential defect according to a classification in which classes correspond to defect types whose implications on an operability of the inspected object differ.

According to an aspect of the invention, herein is disclosed a program storage device readable by machine, tangibly embodying a program of instructions executable by the machine to perform a method for classifying a potential defect identified within an inspection image of an inspected object, the method including the steps of: (i) obtaining multiple anchor locations with respect to the inspection image; (ii) based on the multiple anchor locations and on a mask which defines multiple mask-segments, segmentizing the inspection image by assigning each part out of multiple parts of the inspection image to a respective image-segment selected out of a multiple image-segments, wherein the multiple image-segments correspond to at least one mask-segment of said multiple mask-segments; and (iii) determining a presence of a defect in the inspection image based on the segmentation, the determining of the presence of the defect includes: for each pixel out of a plurality of pixels of the inspection image, assessing the pixel based on: (a) a result of a comparison of the pixel to correlative data of a reference image, and (b) a decision rule which depends on the image-segment selected for the pixel.

Optionally, the obtaining may include computing the multiple anchor locations based on a matching of a template to multiple portions of the inspection image.

Optionally, the method may further include generating the template, wherein the generating includes downsampling at least a part of a reference image of an inspected-object reference area Optionally, the mask is determined based on the reference image Optionally, the method may further include generating the template by processing a reference image which is generated from CAD data.

Optionally, the inspected object is selected from a group consisting of an electronic circuit, a wafer, and a photomask.

Optionally, an accuracy of the computing of the anchor locations exceeds a resolution of the inspection image.

Optionally, at least two of the portions are at least partly overlapping.

Optionally, the method may further include generating the mask by processing a reference image which is generated from CAD data.

Optionally, the determining of the presence of the defect is based on different detection schemes defined for different areas of the inspection image, wherein the defining is based on the segmentation.

Optionally, the method may include determining a distribution of each out of a plurality of pixels of the inspection image with respect to one or more of the plurality of mask-segments; wherein the segmentizing is based on the distributions determined for the plurality of pixels.

Optionally, the determining of the presence of the defect may includes: (a) based on a defect-detection mask which defines different defect-detection segments and on a location determined with respect to the inspection image, determining a defect-detection distribution of a potential defect with respect to one or more of the defect-detection segments; and (b) classifying the potential defect based on the defect-detection distribution.

Optionally, the determining of the presence of the defect may include determining a distribution of a potential defect with respect to one or more mask-segments at an accuracy which exceeds the resolution of the inspection image; and classifying the potential defect based on the distribution.

Optionally, the determining of the presence of the defect may includes classifying the potential defect based on a selection of one or more image-segments to which one or more parts of the inspection image which are correlative to the potential defect where assigned, wherein the classifying includes classifying the potential defect according to a classification in which classes correspond to defect types whose implications on an operability of the inspected object differ.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1A and 1B illustrate two types of defects in an electronic circuit;

Figure 2:
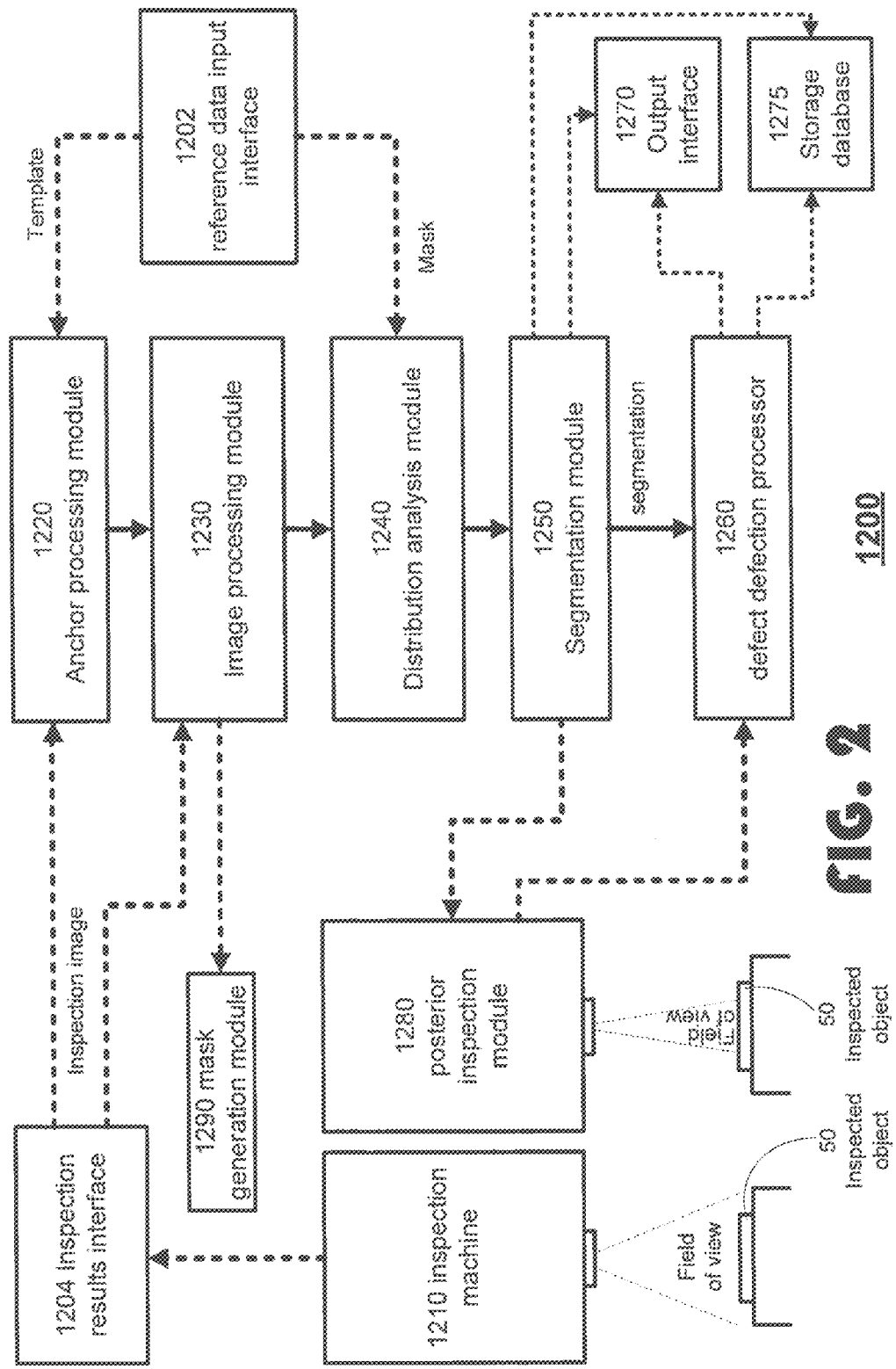
FIG. 2 is a block diagram of a potential-defect analysis system that may be used for classifying potential defects identified within an inspection image of an inspected object, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as processing, calculating, determining, generating, setting, selecting, or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 2 is a block diagram of an analysis system 1200 that may be used for detection of defects within an inspection image of an inspected object 50, according to an embodiment of the invention. While not necessarily so, the inspected object may be selected from a group consisting of an electronic circuit, a wafer, and a photomask. It is to be noted that in other implementations, system 1200 may be used for purposes other than defect detection, and especially for utilizations which require segmentation of an inspection image, as implemented by system 1200.

Regarding the inspection image itself, system 1200 may obtain the inspection image in many ways. For example, system 1200 may be combined with an inspection machine 1210 that is used to inspect the wafer or other types of inspected objects (e.g. during different stages of manufacturing thereof). In another implementations system 1200 may be connected to such an inspection machine, or the inspection image may be transmitted by an off-line device connected to only one of the machines at a time. Also, system 1200 may be an inspection machine into which some or all of the modifications and/or features discussed below have been integrated. Generally, system 1200 may include a sensor that is configured to inspect the inspection object and to provide an inspection image based on the inspection.

As will be discussed below in more detail, one or more of the components of system 1200 may be used to detect defects in a scanned image of the wafer. The results of such detection may later be used in manufacturing the wafer, and/or in later stages of inspection of the wafer. Some of the ways in which system 1200 may operate will become clearer when viewed in light of method 1500 discussed below.

System 1200 includes computerized anchor processing module 1220 (which is also referred to as "correlator 1220"), which is configured to obtain multiple anchor locations with respect to the inspection image. Optionally, anchor processing module is configured to do so by matching a template to multiple portions of the inspection image. For example, anchor processing module 1220 may be configured to compute a correlation between the template and different portions of the inspection image, and to define the anchor locations based on the portions whose correlation with the template is the highest. Optionally, anchor processing module 1220 may be configured to select within the inspection image multiple cell-areas of one or more predetermined cell-sizes (e.g. selecting the area with the highest correlation, based on results of the correlation).

It should be noted that while not necessarily so, computerized anchor processing module 1220 may be configured to compute the anchor locations at an accuracy which exceeds a resolution of the inspection image. Examples of ways in which anchor processing module 1220 may operate are discussed in further detail in relation to stages 1530 and 1540 of method 1500.

The template may be received from reference data input interface 1202, or may be generated by a component of system 1200, such as image processing module 1230. The inspection image may be received via inspection results interface 1204, or may be acquired by imaging system 1210 (also denoted "inspection machine").

System 1200 may include an image processing module 1230. Optionally, image processing module 1230 may be configured to upsample areas (denoted 1110 in FIGS. 6 and 7) associated with the anchor locations (e.g. with a size equal to a size defined by a mask which is discussed below) to a resolution higher than the resolution of the inspection image. In other implementations, image processing module may simply clip parts of the inspection image and transmit them (with or without further image processing) to segmentizer 1250 (or to distribution analysis module 1240). Examples of ways in which image processing module 1230 may optionally operate are discussed in further detail in relation to stage 1550 of method 1500.

System 1200 may include distribution analysis module 1240 which is configured to determine distributions with respect to different segments. For example, distribution analysis module 1240 may be configured to determine, based on the anchor locations and on a mask which defines different mask-segments, distribution of different parts of the inspection image (e.g. of pixels thereof) with respect to one or more of the mask-segments of the mask.

Distribution analysis module 1240 may be configured to determine for each out of a plurality of pixels of the inspection image a distribution of the pixel with respect to one or more of the plurality of mask-segments. According to such an implementation, computerized segmentation module 1250 may be configured to assign parts of the multiple parts to one or more of the image segments based on the distributions determined for the plurality of pixels.

Figure 6:
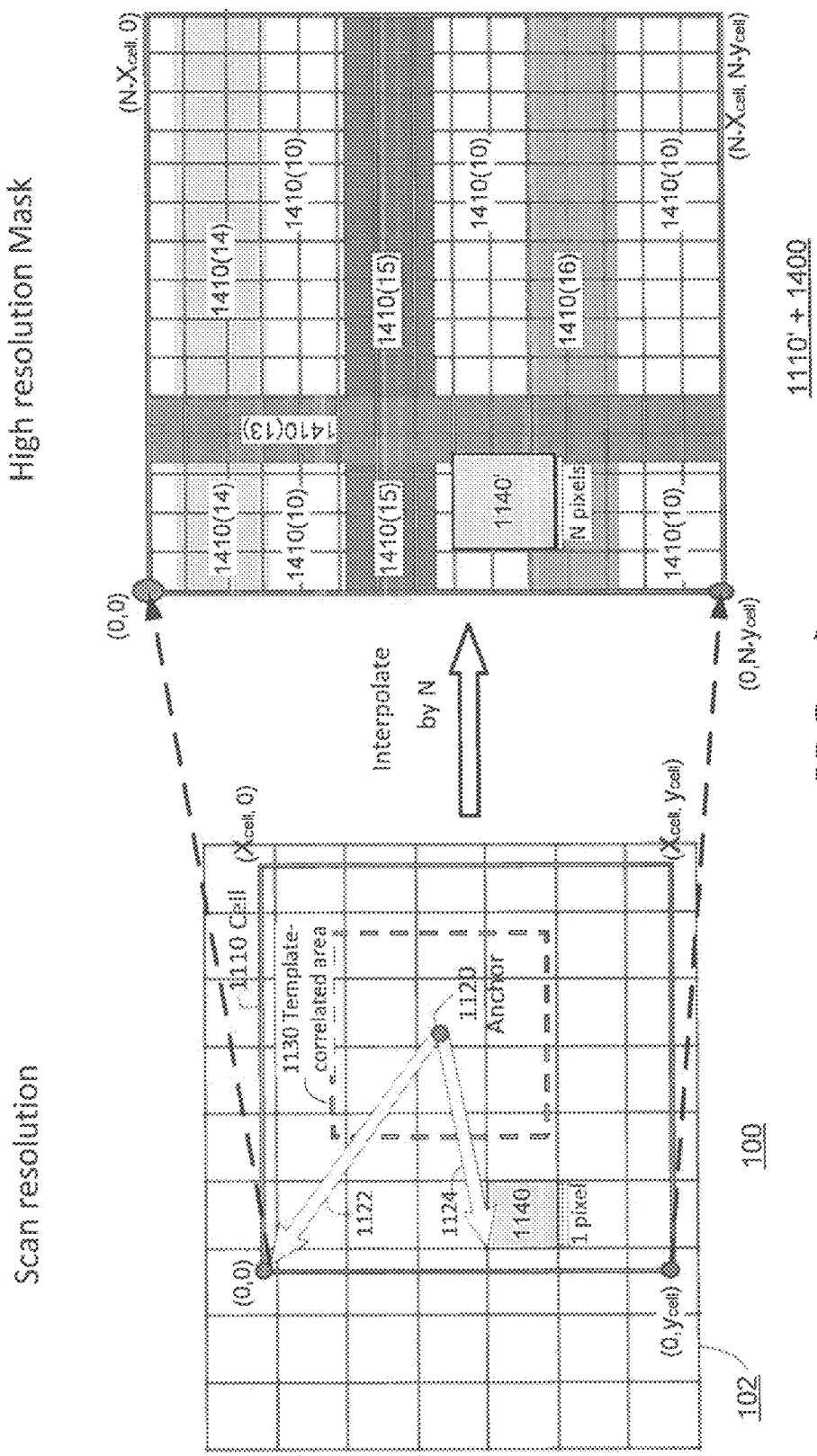
FIG. 6 illustrates relationships between entities used in the classification, according to an embodiment of the invention.
Figure 7:
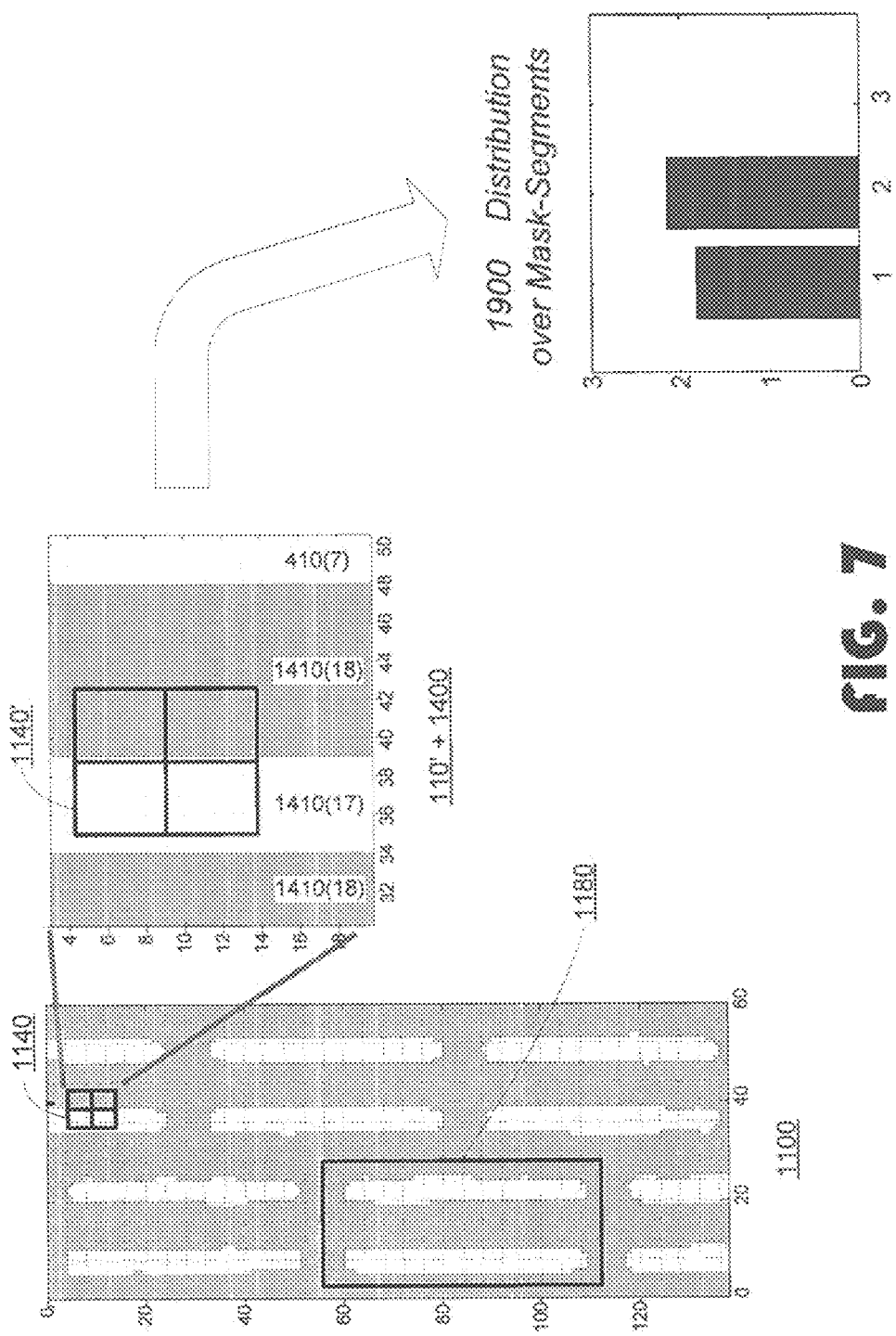
FIG. 7 illustrates distribution of a potential defect identified in an inspection image of a wafer between multiple segments defined by a mask, according to an embodiment of the invention.

Examples of ways in which distribution analysis module 1240 may operate are discussed in further detail in relation to stage 1550 of method 1500, and to FIGS. 6 and 7.

As will be discussed below in more detail, according to an embodiment of the invention, distribution analysis module 1240 may be configured to determine those distributions in a sub-pixel level with respect to the resolution of the mask.

Computerized segmentation module 1250 is operatively connected to computerized anchor processing module 1220 (e.g. via image processing module 1230, via a shared bus, etc.), and is configured to segmentize the inspection image based on the multiple anchor locations and on the mask (which, as aforementioned, defines multiple mask-segments). It should be noted that segmentation module 1250 may use additional factors pertaining to different parts of the inspection image during the segmentation. Examples of ways in which segmentation module 1250 may operate are discussed in further detail in relation to stage 1550 of method 1500.

Segmentation module 1250 segmentizes the inspection image by assigning each part out of multiple parts of the inspection image (e.g. each pixel thereof) to a respective image-segment selected out of a multiple image segments, wherein the multiple image segments correspond to at least one mask-segment of said multiple mask-segments.

Defect detection processor 1260 of system 1200 (which is operatively connected to computerized segmentation module 1250) is configured to determine a presence of a defect in the inspection image based on the segmentation. Defect detection processor 1260 may be configured to determine the presence of the defect at least by assessing each pixel out of a plurality of pixels of the inspection image based on: (a) a result of a comparison of the pixel to correlative data of a reference image, and (b) a decision rule which depends on the image-segment selected for the pixel. Examples of ways in which defect detection processor 1260 may operate are discussed in further detail in relation to stage 1560 of method 1500.

The correlative data of the reference image may be, for example, a corresponding pixel of that reference image (e.g. a pixel located in the same position after alignment of the images), an average of data of several pixels (e.g. if the pixels of the compared images do not correspond to the same physical size of inspected object), correlative data computed from vector information of a vector reference image (e.g. generated from CAD data), and so forth. While not necessarily so, the correlative data pertains to substantially the same area of the inspected object, or to a substantially similar area (e.g. the parallel area in another die of the same wafer).

For example, defect detection processor 1260 may be configured to define different detection schemes to different areas of the inspection image based on the segmentation of at least the part of the inspection image, whereas the defect detection processor 1260 is configured to determine presence of the defect based on a result of the defining. In such an implementation, the different image-segments may be used for segmentizing the inspection image into image-segments in which different defect detection schemes may be implemented. A few examples are as follows:

Different image-segments may indicate different level of interest.

Different image-segments may be analyzed for defects in different resolution, using different computational power, or otherwise implementing different relative amount of resources.

Different image-segments may be analyzed using different defect detection schemes (e.g. die-to-die, die-to-multiple-dies, die-to-database, cell-to-cell, etc.).

Different thresholds for defect detection may be implemented in different image-segments.

Different types of defects may be looked for in different image-segments.

As mentioned above, the multiple image-segments correspond to at least one mask-segment of said multiple mask-segments. In different implementations, different relationships of correspondence between the image-segments and the mask-segments may be applied.

While defect detection processor 1260 may be configured to define different detection schemes to different areas of the inspection image based on the segmentation of at least the part of the inspection image, it may also be configured to define different parameters of a single detection scheme for different areas of the inspection image, based on the segmentation. For example, defect detection processor 1260 may be configured to: (a) calculate differences between corresponding pixels of the inspection image and of a respective reference image (e.g. a second inspection image), and (b) for each pixel out of a plurality of pixels of the inspection image, to assess the pixel based on: (i) the difference calculated for the pair in which the pixel is comprised, and (ii) a decision rule which depends on the image-segment selected for the pixel (for example—the decision rule may involve comparison of the difference to a threshold which is selected based on the image-segment selected for that pixel).

System 1200 may include a tangible storage 1275 (e.g. a hard-drive disk, a flash drive, etc.) for storing the results of the segmentation (of segmentation module 1250) and/or information of defects whose presence was determined by defect detection processor 1260 (e.g. only the defects which were classified as noteworthy) to a tangible storage. System 1200 may also include an output interface 1270 for transmitting such information (or part thereof) to an external system (e.g. over cable connection or over wireless connection), wherein that external system may in turn act based on the segmentation and/or on the defect information.

System 1200 may also include an inspection module, which may be the aforementioned inspection machine 1210 which provides the aforementioned inspection image by scanning of the inspected objects such as the wafers, and may alternatively be posterior inspection module 1280 that is configured to inspect the wafer (or other inspected object) in higher resolution than that of the inspection image.

For example, this inspection module may be configured to selectively scan, in a resolution higher than the resolution of the inspection image, areas of the inspected object which are selected based on the segmentation (e.g. parts of the inspected object which correspond to certain image-segments but not to at least one of the other image-segments). The field of view of posterior inspection module 1280 may be narrower than that of inspection machine 1210, but this is not necessarily so.

In this example, defect detection module 1260 may search for defects only in areas scanned in higher resolution. However, it is noted that defect detection module 1260 may operate directly on the inspection image (without requiring any additional inspection data) and implement the segmentation otherwise in order to determine the presence of one or more defects. For example, defect detection module 1260 may do so by using the segmentation in order to assign different thresholds (or other defect detection criteria) to different parts of the inspection image.

It should be noted that inspection machine 1210 and/or posterior inspection module 1280, if implemented, may be implemented as inspection machines of various types, such as optical imaging machines, electron beam inspection machines, radars, LIDARs and so on.

Generally, identifying defects in a wafer (or in another inspected object) may be implemented using different techniques, among which are optical inspection and electron beam inspection. Utilization of system 1200 may facilitate the use of more than a single inspection technique. For example, an initial inspection of the wafer is firstly carried out relatively quickly and in a coarse manner by inspection system 1200 (e.g. using an optical inspection or an electron beam inspection set for coarse and fast inspection). Later, some of the potential defects found in the initial inspection (selected based on the classification results of classifier 1250) are then studied again using a relatively slower but more exact inspection. Such posterior scanning may be executed either in another mode of inspection machine 1210, or in a different posterior inspection module 1280 (in a process also referred to as "reviewing", e.g. by DRSEM—Defect Review Scanning Electron Microscope).

Referring to the mask mentioned above, optionally the mask may define mask-segments of multiple types, wherein the number of types is smaller than the number of mask-segments. In such implementations, distribution analysis module 1240 may be configured to determine a type-based distribution of the potential defect between one or more of the types; and segmentation module 1250 may be configured to segmentize the inspection image based on the type-based distribution. However, for simplicity of explanation, it will be assumed that each mask-segment is handled independently of other mask-segments.

While not necessarily so, the different mask-segments may correspond to parts of the inspected object having different physical characteristics, such as the material they are made from, their reflective value, their electrical conductance, and so on. As discussed in greater detail below, segmentation module 1250 may be configured to segmentize the inspection image into image-segments that correspond to susceptibility to defect types, whose implications on operability of the inspected object, differ.

It is noted that the mask may be provided to system 1200, or generated by it. Optionally, system 1200 may include a reference data generator implemented on a processor (e.g. on image processing module 1230). The reference data generator is configured to any one or more of the following: (a) define the mask based on a reference image of an inspected-object reference area, (b) downsample a part of such a reference image (possibly the same one, but not necessarily so), and (c) generate the template based on a result of the downsampling. The reference image used for the generation of the mask and/or of the template may be an inspection image, and may also be an image generated from CAD data. Examples of ways in which such a reference data generator may operate are discussed in further detail in relation to method 1600 and to FIG. 9.

As aforementioned, system 1200 may include distribution analysis module 1240 that is configured to determine a distribution of a potential defect with respect to one or more of the plurality of image-segments, and/or a distribution of various pixels of the inspection image with respect to one or more of a plurality of mask-segments.

Optionally, in such an implementation, defect detection processor 1260 may be configured to classify the potential defect based on the distribution. For example, that classifying may include classifying the potential defect according to a classification in which classes correspond to defect types whose implications on operability of the inspected object differ.

Defect detection processor 1260 may also be configured to classify the potential defect based on a selection of one or more image-segments to which one or more parts of the inspection image which are correlative to the potential defect where assigned, according to a classification in which classes correspond to defect types whose implications on an operability of the inspected object differ.

Such ways of classification may include, for example, classifying potential defects in a wafer or a photomask into "edge roughness" defects versus "short gate" defects.

Instead of receiving the mask and the template from an external system via reference data input interface 1202, system 1200 may include a reference data generator (e.g. mask generation module 1290) which is configured to define the mask based on a reference image of an inspected-object reference area.

A reference data generator of system 1200 may be configured to downsample a part of the reference image, and to generate the template based on a result of the downsampling. While the template may have a lower resolution than the reference image and/or the inspection image, it is noted that image processing techniques other than a simple downsampling may also be implemented in the generating of the template, in addition to or instead of the downsampling. The reference data generator may be configured to generate the reference-image from CAD data, or to use a scanning image as a reference.

As aforementioned, some of the ways in which system 1200 and its components may operate are discussed in greater detail with respect to method 1500.

System 1200 may be implemented on a computer (such as a PC), e.g. the computer which implements the overall classification (Image Based Attributing, IBA) of the runtime inspection results, but this is not necessarily so. Each of the modules or components of system 1200 may be implemented in software, hardware, firmware, or any combination thereof. Additionally, system 1200 may also include other components that are not illustrated, and whose inclusion will be apparent to a person who is of skill in the art—e.g. a power source, a display, etc.

Figure 3A:
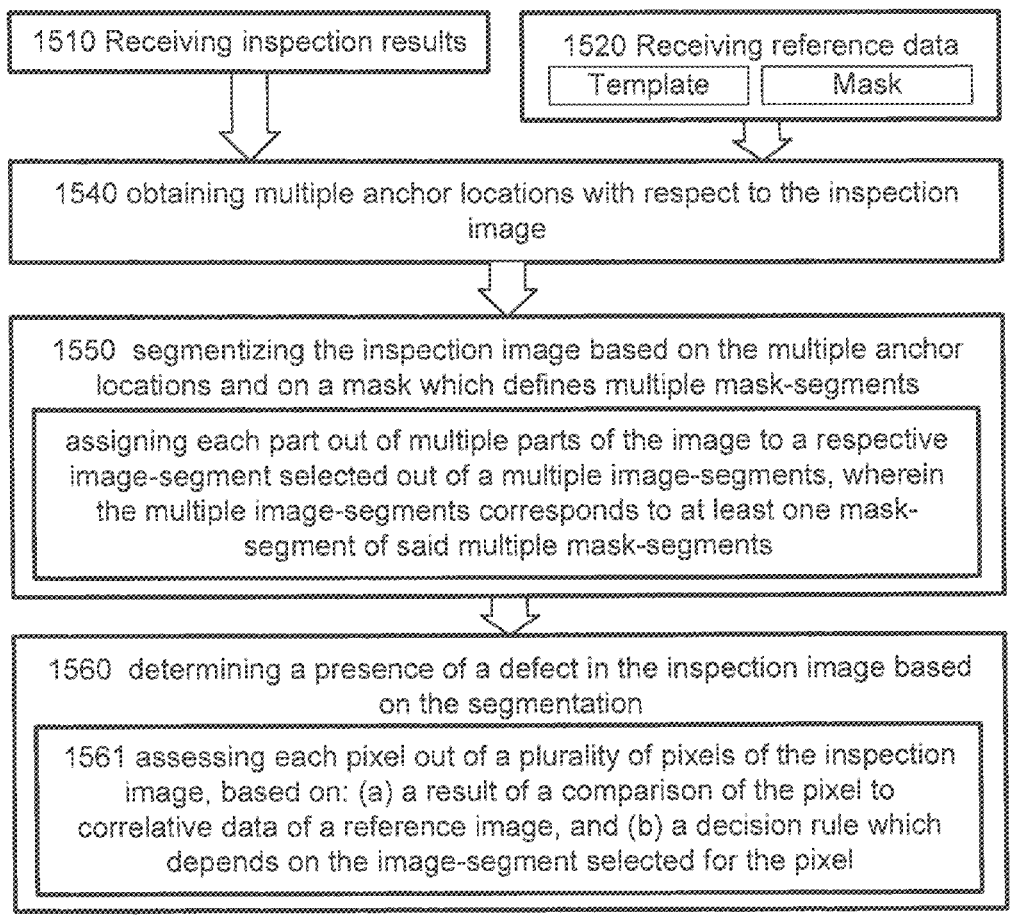
FIG. 3A is a flow chart of a computerized method for defect detection within an inspection image of an inspected object, according to an embodiment of the invention.

FIG. 3A is a flow chart of computerized method 1500 for detection of defects within an inspection image of an inspected object, according to an embodiment of the invention. The inspection image includes a plurality of pixels. Referring to the examples set forth in the previous drawings, method 1500 may be carried out by system 1200. Different embodiments of system 1200 may implement the various disclosed variations of method 1500 even if not explicitly elaborated. Likewise, different embodiments of method 1500 may include stages whose execution fulfills the various disclosed variations of system 1200, even if succinctness and clarity of description did not necessitate such repetition.

Method 1500 may be implemented for various types of inspected objects, from a very minute scale (e.g. millimetric or nanoscale objects) to larger objects such as a geographical area imaged from an airplane or from a satellite. The item identified may be a specific item or a group thereof (e.g. looking for tanks in an areal image), but may also be, for example, a deviation from an expected pattern (such as a hole in a textile fabric, or a potential manufacturing defect in a wafer).

In order to clarify the disclosure, different stages of method 1500 would be exemplified using a revised example of an inspected object which is selected from a group consisting of an electronic circuit, a wafer, and a photomask (a partially transparent plate which may be used for the manufacturing of electronic circuits or other objects in a process implementing transmitting light through such a photomask, such as photolithography). The one or more items identified within the inspection image would be exemplified in such cases using the example of potential defects. A person who is of ordinary skill in the art would nevertheless understand that this is merely but one example, and that many other types of inspected objects and items identified within inspection images thereof (such as the examples provided above) may be implemented.

Method 1500 may include stage 1510 of receiving inspection results which includes the inspection image in which at least part of the inspected object is imaged. Referring to the examples set forth in the previous drawings, stage 1510 may be carried out by an inspection result interface such as inspection results interface 1204 of system 1200. Since later stages are not necessarily performed for the entire inspection image, the receiving may include an indication as to the parts of the inspection image for which the following stages of method 1500 should be carried out.

Clearly, the receiving of the inspection image may be implemented as a stage of capturing (or otherwise generating) the inspection image. For example, this may be implemented by optical photography, by electron beam inspection, by laser beam inspection, and so on. Likewise, item identification information may not only be obtained by receiving same from an external entity, but may also be obtained by image-processing the inspection image, and generating item identification information based on the results of the image processing.

Method 1500 may also include stage 1520 which includes receiving reference data which includes at least one of the data entities referred to below as "template" and "mask", whose content and use will be described below. In another implementation, one or more of those data entities may be created as part of the method. Creation of such data entities is discussed in relation to method 1600, which may be implemented as part of method 1500, or independently thereof. Referring to the examples set forth in the previous drawings, stage 1520 may be carried out by a reference data input interface such as reference data input interface 1202 of system 1200. The template, mask and the segmentation rules may be user defined, machine defined, and so on.

Stage 1520 may include an indication of a part (or several parts) or the inspection image to which segmentation should be applied. If such an indication is received (or alternatively determined as part of method 1500), the following stages are optionally carried out only for that part (or parts).

Figure 4:
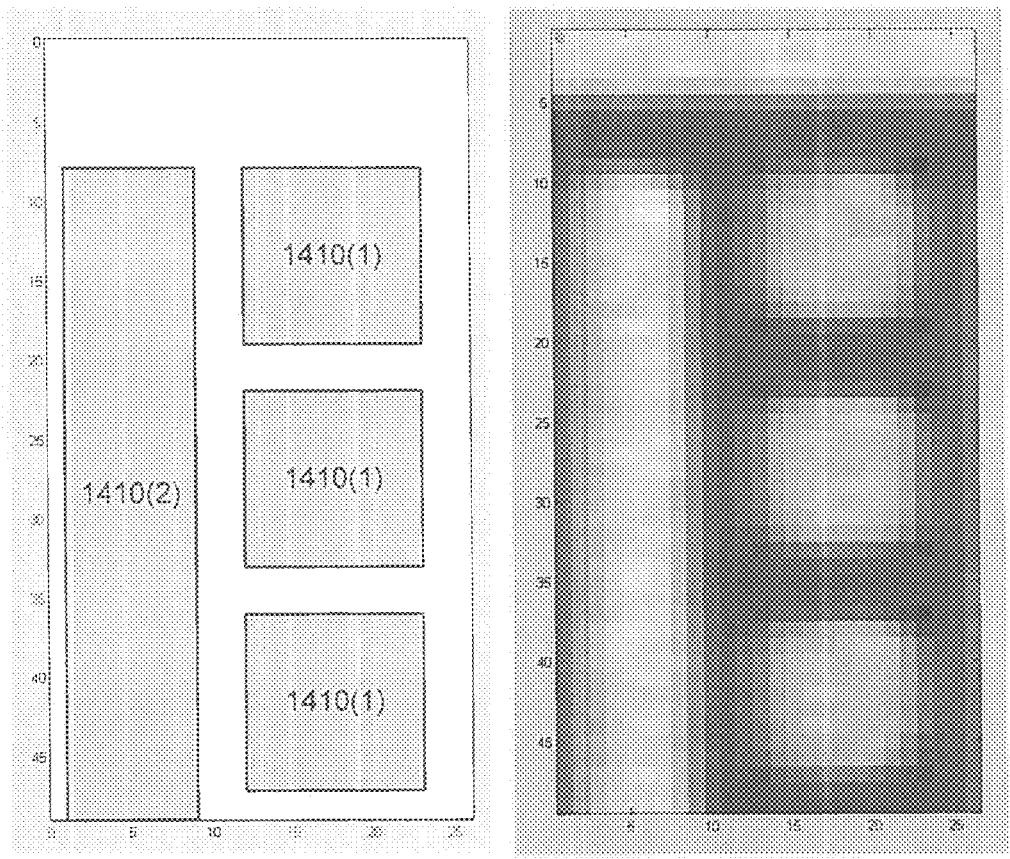
FIG. 4 illustrates a template and a representation of a mask, according to an embodiment of the invention.

The template and mask data entities will be introduced with reference to FIG. 4. FIG. 4 illustrates a template 1300 and a representation of a mask 1400, according to an embodiment of the invention. According to such an embodiment of the invention, template 1300 is an image. The template image may be an actual image of a part of the inspected object, or a similar image. For example, the image data of template 1300 may be obtained by actually imaging a part of the inspected object (or a similar reference object, e.g. as discussed below). In other embodiments the image data of template 1300 may be obtained by processing design data (e.g. CAD data). As will be discussed below, the image data of the template may be obtained by downsampling (i.e. reducing the spatial resolution of) at least a part of an original image of higher resolution. The resolution of the received template may be the same as the resolution of the runtime inspection image, but this is not necessarily so.

The mask (represented by the region denoted 400) defines different segments 1410 (hereinbelow also referred to as "mask-segments"). The segments are defined with respect to a predefined area (also referred to as "cell-sized area". While conversion of units may be applied, the term "size" in the context of the cell-sized area pertains to coordinates of the inspection plane, such as the plane of the inspected layer of the wafer when the latter is inspected).

The different mask-segments 1410 may be of the same or different sizes, and of the same or different shapes. While the mask-segments 1410 are illustrated as rectangular, this is not necessarily so, and mask-segments 1410 of other shapes may also be implemented. The various mask-segments 1410 may cover the entire area of the mask, but this is not necessarily so.

The size of the mask may be defined in response to external data, or otherwise. For example, if the inspected object includes a repeating pattern (e.g. as exemplified in FIGS. 5 and 7), the size of the mask may correspond to the size of the repeating area (denoted 1180 in FIG. 7), or to a part thereof.

Optionally, the mask-segments 1410 defined by the mask 1400 may be of multiple types (e.g. wherein the number of types is smaller than the number of segments). This is exemplified in that the three segments denoted 410(1) are of the same type. Each of the mask-segments 1410 (or of the different types of segments) may correspond to parts of the inspected object that have different physical characteristics. For example, different levels of electrical conductivity in the inspected object may correspond to different types of segments.

The various mask-segments 1410 (or the different types of segments) may be defined according to the type (or types) of items whose analysis is achieved by method 1500. For example, if method 1500 is used for classification of potential defects, different mask-segments 1410 (or types thereof) may correspond to different parts of the inspected object (e.g. wafer, electronic circuit or photomask) which have different susceptibility to defects, and/or different likelihood to have different types of defects. It should be noted that in some implementations, a single segment may cover areas which are not connected to each other. For example, in such an implementation, all of the mask-segments 1410(1) may be considered as a single segment, and not only as several segments of the same type.

The mask may be stored in different formats. For example, it may be stored as an image (in which different colors correspond to different types of segments), as a table (e.g. denoted starting point, dimensions, and possibly type for each of the segments), in vectorial format, and so on.

In FIG. 4, the template 1300 and the mask represented (denoted 400) both correspond to a similarly sized area of the inspected object (albeit possibly having different resolutions). However, in other implementations—e.g. as exemplified in FIG. 6—the physical areas to which the template and the mask pertain may be different from each other. In such a case, one of those corresponding areas may be included within the other (as exemplified in FIG. 6), partly overlapping, and even non-overlapping.

Reverting to FIG. 3A, stage 1540 of method 1500 includes obtaining multiple anchor locations with respect to the inspection image. Those anchor locations may be obtained from an external system, or generated as part of the method. In an example which is discussed below in greater detail, the anchor locations may be computed as part of method 1500 based on a matching of a template and multiple portions of the inspection image.

Each of the anchor locations corresponds to one of the portions of the inspection image. Referring to the examples set forth in the previous drawings, stage 1540 may be carried out by a anchor processing module such as anchor processing module 1220 of system 1200. It is noted that optionally, at least two of the portions are at least partly overlapping (e.g. as in pairs B and C of FIG. 5). Referring to the example of FIG. 6, an anchor location may be, for example, the location of anchor 1120 (which may be a dimensionless point or another kind of an anchor).

Method 1500 continues with stage 1550 of segmentizing the inspection image based on the multiple anchor locations and on a mask which defines multiple mask-segments. For example, the mask may be a mask such as mask 1400 illustrated in FIG. 4. The segmentizing of stage 1550 is implemented by assigning each part out of multiple parts of the inspection image to a respective image-segment selected out of a multiple image-segments, wherein the multiple image-segments correspond to at least one mask-segment of said multiple mask-segments. Referring to the examples set forth with respect to the previous drawings, stage 1550 may be carried out by a segmentation module such as segmentation module 1250 of system 1200.

For example, each such part of the inspection image (which is assigned to one of the image-segments) may be a single pixel. According to such an implementation, stage 1550 may be implemented by assigning each pixel out of multiple pixels of the inspection image (e.g. out of all of the pixels in a rectangular area of the inspection image, e.g. a 100×100 pixels area) to a respective image-segment selected from multiple image-segments.

In other implementations, some or all of the parts of the inspection image which are assigned to one or more of the image-segments may be smaller and/or larger than a single pixel (and furthermore—are not necessarily continuous parts). However, for simplicity of explanation, in the following example it will be assumed that each such part is a single pixel of the inspection image.

While not necessarily so, the different image-segments may correspond to parts of the inspected object having different physical characteristics, such as the material they are made from, their reflective value, their electrical conductance, and so on. As discussed in greater detail below, the determining of a presence of a defect in the inspection image in stage 1560 (which is based on the segmentation), wherein the presence of the defect in the inspection image is indicative of phenomena (e.g. a defect) in the inspected object which affects its level of operability.

The different image-segments may be used for segmentizing the inspection image into image-segments in which different defect detection schemes may be implemented. In but a few examples:

Different image-segments may indicate different levels of interest.

Different image-segments may be analyzed for defects in different resolutions, using different computational power, or otherwise implementing different relative amount of resources.

Different image-segments may be analyzed using different defect detection schemes (e.g. die-to-die, die-to-multiple-dies, die-to-database, cell-to-cell, etc.).

Different thresholds for defect detection may be implemented in different image-segments.

Different types of defects may be looked for in different image-segments.

As mentioned above, the multiple image-segments correspond to at least one mask-segment of said multiple mask-segments. In different implementations, different relationships of correspondence between the image-segments and the mask-segments may be applied.

Figure 5:
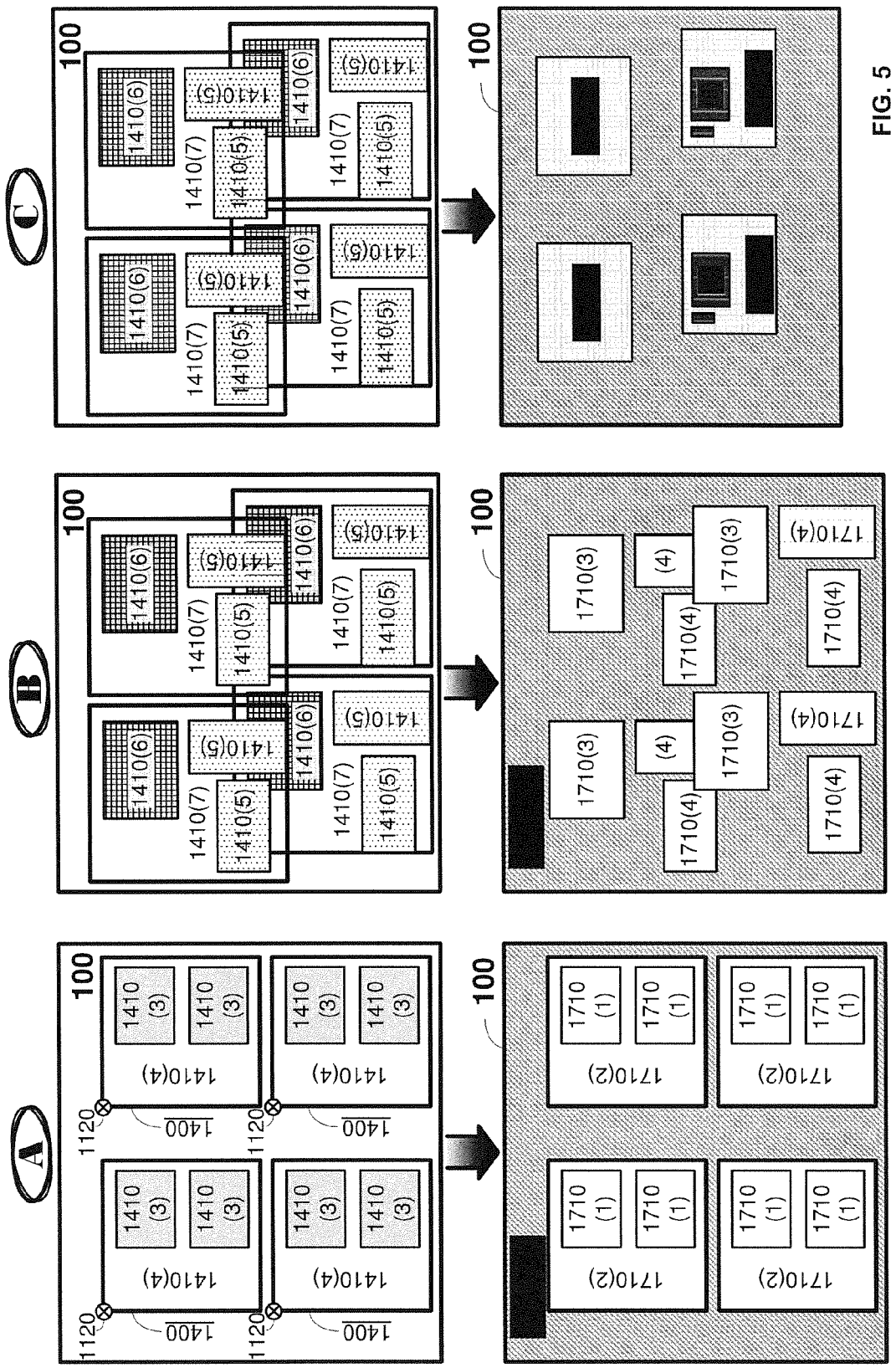
FIG. 5 illustrates several relationships of correspondence between the image-segments and mask-segments of the mask, according to an embodiment of the invention.

FIG. 5 illustrates several relationships of correspondence between the image-segments and mask-segments of the mask. Each vertical pair of inspection images 100 represent the same inspection image.

In each of the pairs, the top version of image 100 is overlaid with multiple mask-size areas (each represented as 1400 in pair "A"). The location of the representation of the mask 1400 with respect to inspection image 100 may be determined with respect to the multiple anchor locations (denoted 1120 in pair "A") determined with respect to inspection image 100 in stage 1540 (based on the matching of the template and multiple portions of inspection image 100). It is noted that correlation between mask-segments 1410 and the inspection image 100 are discussed in more detail with respect to FIG. 6, discussed below.

In each of the pairs, the bottom version of image 100 is a representation of the segmentation, in which different image-segments 1710 are illustrated. In pairs B and C, due to insufficiency of the size of some of the image-segments in those pairs, image-segments 1710(4) and 1710(8) are occasionally denoted abbreviated to (4) and (8) respectively.

The inspection image 100 in each pair is assumed to be the same image, but there is not such a relation between images 100 of the different pairs.

The relationship in pair A is a fairly straightforward relationship which is substantially a bijective function in which for each image-segment 1710 there is exactly one corresponding mask-segment 1410, and vice versa. Since not all areas of inspection image 100 necessary correspond to a part of the mask (e.g. as shown in pair A), other areas are assigned to the image-segment denoted 1710(0).

As is exemplified in pairs B and C, some areas of inspection image 100 may correspond to more than one mask-segment 1410. This may occur (as in the illustrated examples) as a result of correlating to the mask areas of the inspection image which are partly overlapping.

In the relationship of pair B, areas of inspection image 100 which correspond to mask-segment 1410(6) are assigned to image-segment 1710(3), and areas of inspection image 100 which correspond to mask-segment 1410(5) are assigned to image-segment 1710(4)—unless they also correspond to mask-segment 1410(6). That is, stage 1550 of assigning may include assigning one or more of the areas which correspond to multiple mask-segments into a single image-segment (e.g. based on a hierarchy of mask-segments, as exemplified in pair B). Areas which correspond to mask-segment 1410(7)—or to no mask-segment at all—are assigned to image segment 1710(5).

The inspection image 100 of pair C is similar to that of pair B (as different segmentation rules may be implemented for a single inspection image—whether in different implementations of the invention, or in different instances of segmentation of a single image).

In the relationship of pair C, areas of inspection image 100 which correspond to both mask-segment 1410(5) and 1410(6) are assigned to image segment 1710(8) (illustrated with a dark fill in FIG. 5). Areas of inspection image 100 which correspond to mask-segment 1410(6)—or which are located within a distance of N pixels from such areas—are assigned to image-segment 1710(7) (with the exception of areas also assignable to image-segment 1710(8)).

Assigning of areas of the inspection image which are within the distance of N pixels is an example of that stage 1550 may include assigning a first part of the inspection image to an image-segment based on the correspondence of another part of the inspection image to one or more mask-segments.

Reverting to FIG. 3A, the segmentizing of stage 1550 may depend on the anchor locations and on the mask in various ways. The segmentizing of stage 1550 may be further based on segmentation rules (which may also be referred to as "segmentation logic").

The segmentation rules may indicate to which image-segment a given part of the inspection image (e.g. a pixel) should be assigned. Optionally, the segmentation rules may be based on a distribution of the part between different mask-segments. Some ways in which this distribution may be determined are discussed with respect to FIGS. 6 and 7 (especially with respect to the latter). The distribution may indicate for a part of the inspection image (e.g. a pixel) the relation between its relative parts which correspond to different mask-segments (when the latter is "anchored" to it with respect to anchors determined in stage 1540). While a more detailed and varied discussion is provided with respect to FIGS. 6 and 7 below, the present discussion may be easily understood if assuming that the distribution determined for a part of the inspection image (which is X pixels large, X being a natural number or a positive real number) simply indicates the pixel-size of each of the areas of the part which correspond to different mask-segments.

For example—the distribution determined for a given part of the inspection image (denoted 1140 in FIGS. 6 and 7) may be:

Mask-segment 1410($N_1$): area of $P_1$ pixels;

Mask-segment 1410($N_2$): area of $P_2$ pixels;

. . . ;

Mask-segment 1410($N_n$): area of $P_n$ pixels.

The image-segment to which each of the image parts of stage 1550 may be assigned may be selected based on such distribution determined for it (e.g. as part of stage 1550). By way of example, referring to the illustration of FIG. 7, the segmentation rules may indicate that a part 1140 of the image should be assigned to image-segment 1710(1) if less than 50% of it corresponds to mask-segment 1410(7), but assigned to image-segment 1710(2) if more than 50% of it corresponds to this mask-segment 1410(7).

Table 1 is an example of segmentation logic, according to an embodiment of the invention. The outcome selection of image-segment is shown in the Image Segment column, and the rules by which this image-segment is selected are represented by the symbols (1, 0, X) in the middle five columns "1" represents that the mask-segment must be found, "X" represents that the mask-segment may or may not be found, and "0" represents that the mask-segment must not be found. The priority indicates that, in implementation, if the conditions for two or more rules are fulfilled, the rule with the lower priority index would be selected. For example, fulfillment of the conditions for selection of rule 2 would also qualify for rule 3. However, since rule 2 has a lower priority index, it will be selected over rule 3.

TABLE 1

| Priority | Mask-Segment 1 | Mask-Segment 2 | Mask-Segment 3 | Mask-Segment 4 | Other | Image segment |
|---|---|---|---|---|---|---|
| 1 | 0 | 0 | 0 | 1 | 0 | A |
| 2 | 0 | 0 | 0 | 1 | 1 | B |
| 3 | 1 | 1 | 0 | X | X | A |
| 4 | 1 | 1 | 1 | X | X | C |

The segmentation of stage 1550 may be a part of a larger segmentation process, which may depend on other parameters as well. For example, the segmentation of the image part may also depend on corresponding CAD data.

As aforementioned, the different types of the mask-segments may correspond to parts of the inspected object which have different physical characteristics (e.g. electrical characteristics, different internal construction, made of different material, and so on). In such a case, the segmentation may include segmentizing the inspection image into image-segments that correspond to areas susceptible to different defect types which have electrically different implications on electrical operability of the inspected object. This may include, for example, classifying potential defects in a wafer or a photomask into "edge roughness" defects versus "short gate" defects.

The segmentation of the inspection image (determined in stage 1550) may be utilized in various manners. For example, method 1500 may continue with selectively scanning areas of the inspected object in a resolution higher than the resolution of the inspection image. In such a case, the areas selected for further scanning may correspond to one or more of the image-segments (but not to at least one of the other image-segments). For example, the scanning in higher resolution may be carried out in areas prone to possible defects classified as "short gate", but not in areas susceptible to possible defects classified as "edge roughness".

Referring to the examples set forth in the previous drawings, the selective scanning in the higher resolution may be carried out by an inspection machine such as inspection machine 1210, or by a posterior inspection module (which may be another inspection machine), such as posterior inspection module 1280. For example, if the inspected object is indeed a wafer, the inspection image may be obtained using Electron Beam Inspection (EBI) in a first resolution, while the potential defects selected, based on the way in which they were classified, may be further inspected in much higher resolution by a Defect Review Scanning Electron Microscope (DRSEM).

The wafer (or specific dies thereof) may be declared as operational or nonoperational based on the high resolution inspection of the selected potential defects. Inspecting only potential defects classified based on the mask, while not inspecting other potential defects (which may be located in "uninteresting" areas of the wafers) saves time and resources, and may also improve the results of the inspection. For example, scanning less areas of the wafer would lead to less accumulation of electrical charge resulting from the electrons beamed by the electron beam scanning apparatus.

In the following paragraphs, a utilization of determining of a presence of a defect in the inspection image is discussed.

Optional stage 1560 of method 1500 includes determining a presence of a defect in the inspection image based on the segmentation. Referring to the examples set forth with respect to the previous drawings, stage 1560 may be carried out by a defect defection processor such as defect defection processor 1260 of system 1200.

It is noted that the determining of the presence of the defect may be based on other information apart from the segmentation of the inspection image and/or may be based on additional preliminary processes.

For example, the determining of the presence of a defect in stage 1560 may be based on the results of stage 1561 which includes assessing each pixel out of a plurality of pixels of the inspection image, based on: (a) a result of a comparison of the pixel to correlative data of a reference image, and (b) a decision rule which depends on the image-segment selected for the pixel.

Optionally, the comparing is carried out for all of the pixels of the image, or at least for all of the pixels in a majority of the pixels. The decision rule may include, for example, scoring each of the pixels and selecting as potential defects (i.e. such for which additional processing is required before a presence of a defect may be determined) or directly as defects pixels one or more pixels with the highest scores.

The correlative data of the reference image may be, for example, a corresponding pixel of that reference image (e.g. a pixel located in the same position after alignment of the images), an average of data of several pixels (e.g. if the pixels of the compared images do not correspond to the same physical size of inspected object), correlative data computed from vector information of a vector reference image (e.g. generated from CAD data), and so forth. While not necessarily so, the correlative data pertains to substantially the same area of the inspected object, or to a substantially similar area (e.g. the parallel area in another die of the same wafer).

In an example for such a comparison, method 1500 (e.g. as part of stage 1560) may include comparing the inspection image to a respective reference image (e.g. a second inspection image, an image generated from CAD data, and so for), for calculating differences between corresponding pixels of the inspection images. E.g. if the inspection images are gray-scale images, the comparing may include determining a difference value for each pixel of at least a part of the inspection image, the difference level being equal to the difference between the gray-level (GL) value of that pixel and the GL value of the corresponding pixel in the respective reference image. It is noted that in cases in which the respective reference image is a second inspection image, it may include information of the same inspection object, or of another object.

For example, if the inspection image is an image of a wafer die (or a part thereof)—the second inspection image may be an image of the same die (in a cell-to-cell comparison scheme), an image of another die in the same wafer (in a die-to-die comparison scheme), and may also be an image of a die of another wafer (in a comparison scheme in which all wafers of a batch are compared to a single die).

When determining presence of defects in an inspection image based on such differences, the differences determined based on the comparison of the inspection images are processed to determine whether they indicate a defect. This may include comparing each such difference value to a threshold. Such thresholds are not necessarily identical for all of the pixels of the inspection image.

Among other factors on which the determination of such a threshold may be based (e.g. noise indicative parameters such as variance, or other pixel classifications), the thresholds may be determined based on the image-segment selected for the pixel. Likewise, decision rules other than comparison to a threshold may also be implemented.

Figure 3B:
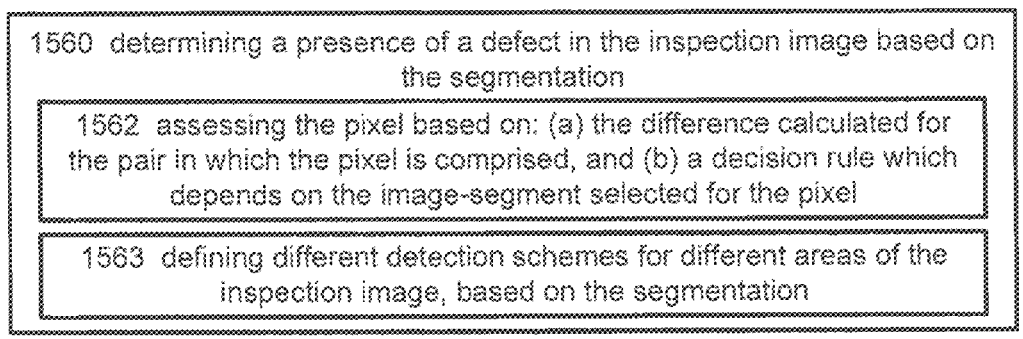
FIG. 3B illustrates a part of a computerized method for defect detection within an inspection image of an inspected object, according to an embodiment of the invention.

Referring to FIG. 3B in which some of the possible variations of stage 1560 are illustrated, the determining of the presence of the defect in stage 1560 may include stage 1562 which may be carried for each pixel out of a plurality of pixels of the inspection image. Stage 1562 may be regarded as an optional variation of stage 1561.

Stage 1562 includes assessing the pixel based on: (a) the difference calculated for the pair in which the pixel is comprised, and (b) a decision rule which depends on the image-segment selected for the pixel. It is noted that stage 1562 may also be implemented for parts of the inspection image (e.g. those of stage 1550) other than independent pixels.

It should be noted that optionally, the determining of the presence of the defect in stage 1560 may include multiple sub-steps. For example, stage 1560 may include defining a group of defect candidates (e.g. a group of suspicious pixels), and following steps of analyzing the candidates (e.g. by further analyzing the existing inspection data and/or by acquiring additional data—such as by way of inspection of possibly defected locations of the inspected object in higher resolution or another inspection techniques) to determine which of the candidates is indeed indicative of a presence of a defect.

If determining of the presence of the defect is indeed executed in multiple sub-steps, it is noted that the utilization of the segmentation data is not necessarily implemented for all of those sub-steps. For example, considering such a decision rule which is based on the difference and on the image-segment selected for the image part (e.g. the pixel), implementation of that decision rule may be used to define the group of defect candidates, while following stages (which do not necessarily use the segmentation information) are executed to filter false candidates out of the group.

Referring to optional stage 1563, it is noted that the determining of the presence of the defect may be based on different detection schemes defined for different areas of the inspection image, wherein the defining is based on the segmentation. Stage 1563 includes defining different detection schemes for different areas of the inspection image, based on the segmentation. The determination of different detection schemes may be based on additional factors as well. Stage 1563 is followed by executing the detection schemes for the different areas. A number of different detection schemes have been suggested above, e.g.:

- Different image-segments may indicate different levels of interest, and therefore implementing detection schemes with different computational requirements for different areas.
- The different areas (defined based on the different image-segments) may be analyzed for defects in different resolutions, using different computational power, or otherwise implementing different relative amounts of resources.
- The different areas (defined based on the different image-segments) may be analyzed using different defect detection schemes (e.g. die-to-die, die-to-multiple-dies, die-to-database, cell-to-cell, etc.).
- Different thresholds for defect detection may be implemented in different areas.
- Different types of defects may be looked for in the different areas.

Figure 3C:
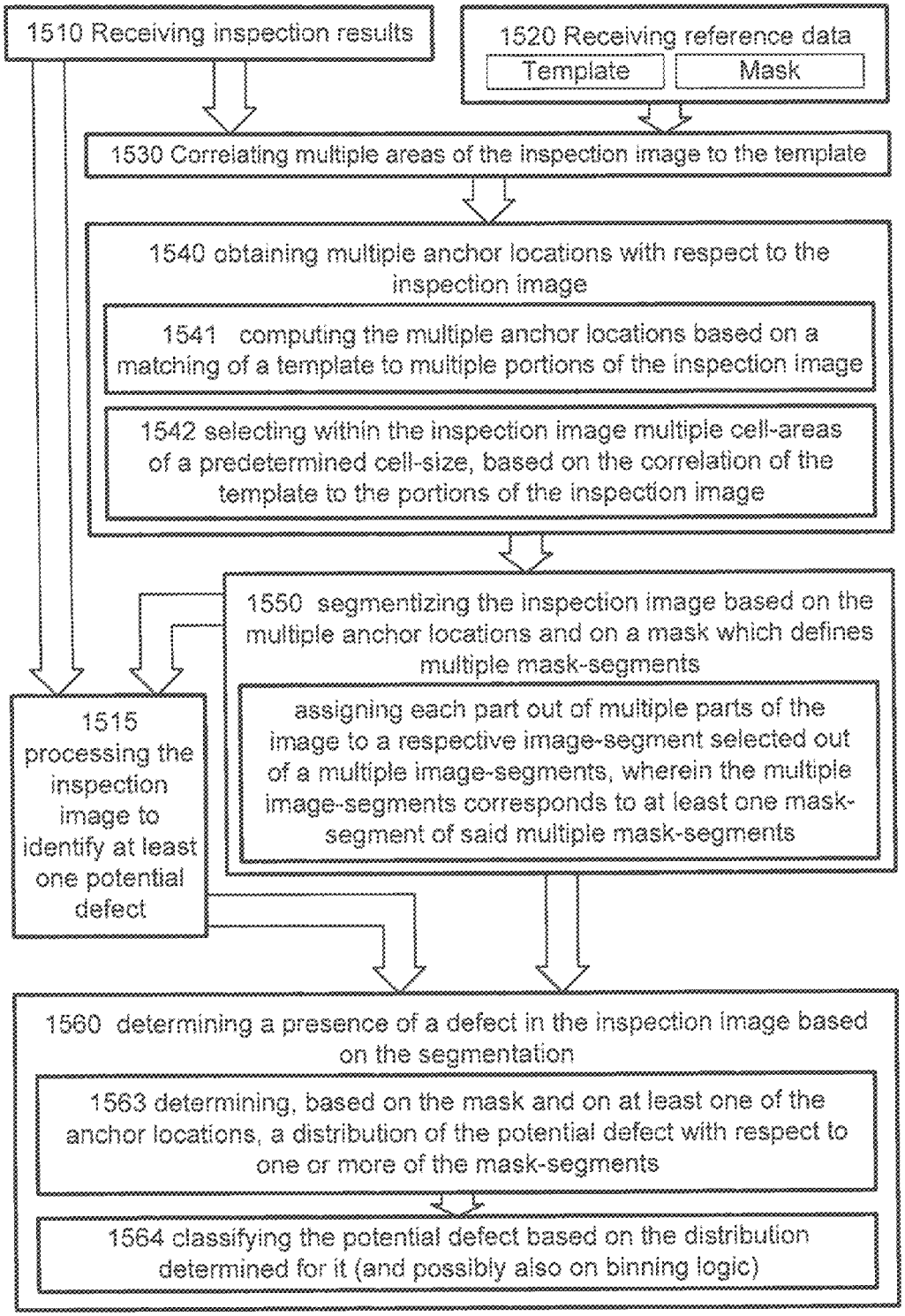
FIG. 3C is a flow chart of a computerized method for defect detection within an inspection image of an inspected object, according to an embodiment of the invention.
Figure 3D:
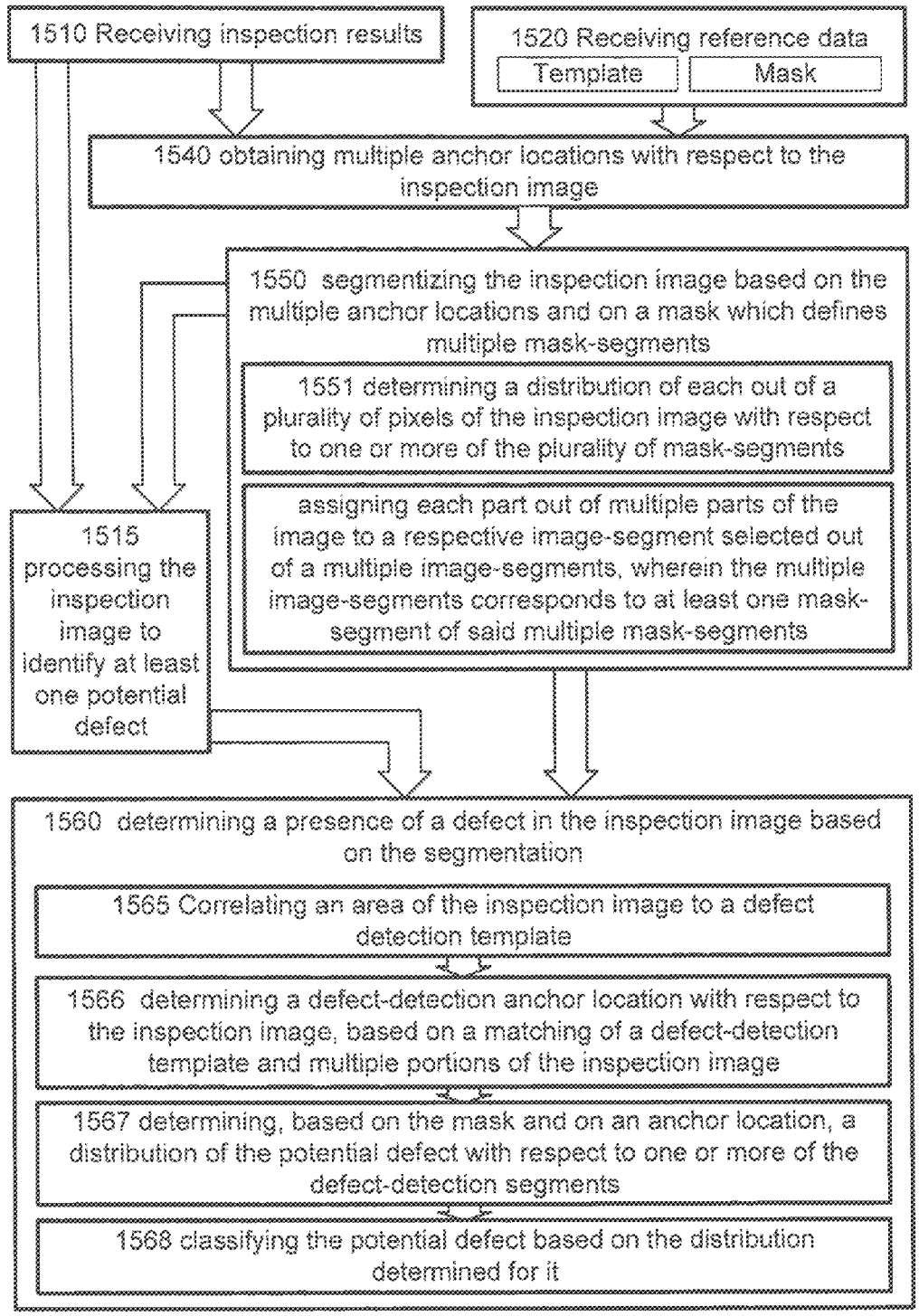
FIG. 3D is a flow chart of a computerized method for defect detection within an inspection image of an inspected object, according to an embodiment of the invention.

FIGS. 3C and 3D are flow charts of computerized method 1500, according to embodiments of the invention. It is noted that stages illustrated in any one of FIGS. 3C and 3D may be integrated into the implementation illustrated in FIG. 3A, and vice versa.

Referring to FIG. 3C, it is noted that stage 1540 of obtaining the anchor locations may include computing the multiple anchor locations. Such a computing may be implemented, for example, as stage 1541 of computing the multiple anchor locations based on a matching of a template to multiple portions of the inspection image. Other ways of computing may also be implemented. For example, the inspection image may be imaged processed for detection of repeating patterns (e.g. by convoluting areas of varying sizes within the inspection image, by analyzing a frequency domain representation of the image, and so forth). In another example, information other than the inspection image itself may be processed. For example, the anchor locations may be computed based on a processing of CAD data which corresponds to the inspection image.

Reverting to stage 1541, one possible implementation of stage 1541 is based on the results of optional stage 1530, which is discussed below.

Method 1500 may include stage 1530 of correlating the template and multiple areas of the inspection image. While the template is not necessarily identical to any of the correlated portions of the inspection image, its correlation to some of the portions would be higher than its correlation to others. For example, the correlation of the template to one of the portions may be relatively high, and at least higher than portions of the inspection image which are slightly shifted with respect to said portion. Referring to the examples set forth in the previous drawings, stage 1530 may be carried out by a anchor processing module such as anchor processing module 1220 of system 1200.

It should be noted that the correlation does not necessarily conform to the pixels of the inspection image. It is noted that the correlation may be implemented in sub-pixel accuracy (e.g. in accuracies of thousandth of a mask pixel). As can be seen in the example of FIG. 6, area 130, which is assumed in the example to be the one best correlating the template, is not located on the grid representing the pixels of the inspection image 100, but is rather located (hence determined) in a sub-pixel resolution. The correlating of stage 1530 may be carried out only in areas of the inspection image which are indicated in the reference data, but this is not necessarily so.

Referring to the example of FIG. 6, an anchor location may be, for example, the location of anchor 1120 (which may be a dimensionless point or another kind of an anchor). It should be noted that while the matching of the template and each of the portions of the image (if implemented, e.g. area 130 illustrated in FIG. 6) may be accomplished by a correlation (such as in stage 1530), in other implementations other matching techniques may be implemented (such as pattern detection, and so on). While not necessarily so, in some implementations an accuracy of the computing of the anchor locations exceeds a resolution of the inspection image.

Optionally, stage 1540 may includes optional stage 1542, which includes selecting within the inspection image multiple cell-areas of a predetermined cell-size, based on the correlation of the template to the portions of the inspection image (or other type of matching, such as those discussed above). If a geometrical relationship between each of the anchor locations and the cell-sized area corresponding to it is known in advance (e.g. arrow 1122 of FIG. 6, as well as the size of area 1110), the selecting of the cell-area in stage 1542 may be a direct by-product of the selecting of the anchor locations in stage 1541. It is noted that in alternative implementations, cell-areas which correspond to different anchor locations may be of different sizes.

While conversion of units may be applied, the term "size" in the context of the cell-area pertains to coordinates of the inspection plane (e.g. the plane of the inspected layer of the wafer when the latter is inspected). While the cell-size may be identical to the area-size defined by the mask, this is not necessarily so, and the mask may define the segments within a larger area, that includes the aforementioned cell-sized area.

Referring to the examples set forth in the previous drawings, stage 1541 may be carried out by a correlator such as anchor processing module 1220.

It should be noted that if the resolution of the mask is higher than that of the cell-area, then the two areas would have different pixel size, even if pertaining to similar sized areas in the inspection plane. Referring to the size of the template in the coordinates of the inspection plane, the size of the cell-area may be smaller, similar, or larger than the area of the template.

In some implementations of the invention, a decision rule may be implemented prior to execution of stage 1541, according to which if no area of the inspection image may be matched to the template in a sufficiently successful manner, the method is terminated. For example, if no portion of the inspection image is found to have a correlation score which exceeds a predetermined threshold, an anchor location is not necessarily determined. While one possible result of stage 1530 (or another stage of matching the template to an area of the inspection image) is singling out of at least one portion of the inspection image based on its correlation to the template, another possible result is that no area is found to be matching.

Reverting to stage 1541, optionally, an anchor may be defined for any one of those singled out portions of the inspection image (referring to the example of FIG. 6, an anchor 1120 may be defined within or otherwise with respect to area 130 selected within inspection image 100). If stage 1542 is implemented, the selecting of that stage may include selecting the portion (or portions) of the inspection image singled out in stage 1530, but may also include selecting another area of the inspection image. Referring again to the example of FIG. 6, the area 1110 selected in stage 1542 is larger than the area 130 selected in stage 1530. Area 1110 (also referred to as "cell-area" xx110) may be defined with respect to anchor 1120 which is computed in stage 1541 (for example it may be defined with respect to area 130, which was singled out of the inspection image, based on the matching).

An example of an inspection image in which multiple portions of the image are matched to the template are inspected objects which include a repeating pattern (e.g. as exemplified in FIG. 66). If the template corresponds to a part (or all) of the area that is repeated in the pattern, many similar portions of the inspection image may be matched to the template (e.g. correlated, as in stage 1530), and many anchor locations may be computed correspondingly in stage 1541. Optionally, the multiple cell-areas selected cover the entire inspection image (or at least the processed part of the inspection image, if only a part of it is processed.

For example, the inspected object imaged in the inspection image 100 of FIG. 66 includes a repeating pattern that includes multiple occurrences of a pair of vertical lines. While those multiple areas are not identical, each matching of the template to one of those areas may nevertheless result in a defining of a separate anchor location in stage 1541 (e.g. based on a correlation of different portions of the inspection image to a template, which is not shown).

Multiple portions of the inspection image that are similar to the template may yield computation of multiple anchor locations (and possibly also to a selection of multiple cell-sized areas) even if the similar portions do not form a recurring pattern. All the more so, in some implementations multiple templates may be implemented (e.g. which correspond to different recurring patterns in the wafer), wherein multiple anchor locations may be computed in stage 1541 based on a matching of various areas of the inspection image to multiple templates. In such a case, masks of different sizes may be used for such areas.

Referring now to stage 1515, Method 1500 may include stage 1515 of analyzing the inspection image based on the segmentation for identifying at least one potential defect. Stage 1515 may include determining information regarding the potential defect such as location information, size/shape information, type information etc. It is noted that while stage 1515 may be a part of stage 1560 (e.g. as discussed earlier), it is illustrated as an independent preliminary stage for convenience of explanation. Referring to the examples set forth with respect to the previous drawings, stage 1515 may be carried out by a defect detection processor such as defect detection processor 1260.

One of the ways in which such a potential defect may be analyzed as part of stage 1560 for determining a presence of a defect is by determining a distribution of a potential defect with respect to one or more of the plurality of image-segments; and classifying the potential defect based on the distribution. One difference between the implementations of method 1500 is that in the implementation of FIG. 3C, the same anchor locations and mask are used (e.g. by directly using the segmentation of stage 1550), while in the implementation of FIG. 3D—a mask different than the one used for the segmentation (which is used for identifying the potential defect) is used for the analyzing of the potential defect to determine a presence of a defect.

It is noted that the segmentation may be a time and/or computational power consuming process, and therefore utilizing the results of the segmentation may be preferred. Utilization of different masks (as in the example of FIG. 3D) may be preferred, for example, if different considerations are used for the two processes (e.g. one mask to determine detection schemes and another for analyzing a defect).

Referring to FIG. 3C, the determining of the presence of the defect in stage 1560 may include stage 1563 of determining, based on a defect-detection mask (other than the mask of stage 1550) which defines different defect-detection segments and, on at least one of the anchor locations, a distribution of the potential defect with respect to one or more of the mask-segments. Referring to the examples set forth with respect to the previous drawings, stage 1563 may be carried out by a distribution analysis module such as distribution analysis module 1240. Stage 1563 is followed by stage 1564 of classifying the potential defect based on the defect-detection distribution (and potentially on other data, such as segmentation logic, e.g. as discussed below). Referring to the examples set forth with respect to the previous drawings, stage 1564 may be carried out by a classifier that may be included, for example, in defect detection processor 1260.

Referring to FIG. 3D, the determining of the presence of the defect in stage 1560 may include stage 1567 in which, based on a defect-detection mask (other than the mask of stage 1550) which defines different defect-detection segments and on a location determined with respect to the inspection image, determining a defect-detection distribution of a potential defect with respect to one or more of the defect-detection segments. Referring to the examples set forth with respect to the previous drawings, stage 1567 may be carried out by a distribution analysis module such as distribution analysis module 1240.

Stage 1567 is followed by stage 1568 of classifying the potential defect based on the defect-detection distribution (and potentially on other data, such as segmentation logic, e.g. as discussed below). Referring to the examples set forth with respect to the previous drawings, stage 1568 may be carried out by a classifier that may be included, for example, in defect detection processor 1260.

It is noted that the location utilized in stage 1567 is an anchor location. It may be one of the anchor locations obtained (e.g. determined) in stage 1540, or another anchor location (especially if another template is used for selecting those masks). If the latter option is implemented, that method 1500 may include stage 1566 of determining a defect-detection anchor location with respect to the inspection image, based on a matching of a defect-detection template and a portion of the inspection image (an accuracy of the determining of the defect-detection anchor location may exceed a resolution of the inspection image). If this stage is implemented, then the location mentioned in stage 1567 is the defect-detection anchor location. Stage 1566 may be based on results of optional stage 1565 of correlating one or more areas of the inspection image to the defect-detection template.

Optionally, the determining of the presence of the defect may include determining a distribution of a potential defect with respect to one or more mask-segments (e.g. as exemplified in FIGS. 3C and 3D), at an accuracy which exceeds the resolution of the inspection image; and classifying the potential defect based on the distribution.

Optionally, the determining of the presence of the defect may include determining a distribution of a potential defect with respect to one or more mask-segments (e.g. as exemplified in FIGS. 3C and 3D); and classifying the potential defect based on the distribution; wherein the classifying includes classifying the potential defect according to a classification in which classes correspond to defect types whose implications on the operability of the inspected object differ.

Optionally, the determining of the presence of the defect is stage 1560 may include classifying the potential defect based on a selection of one or more image-segments to which one or more parts of the inspection image which are correlative to the potential defect where assigned; wherein the classifying includes classifying the potential defect according to a classification in which classes correspond to defect types whose implications on an operability of the inspected object differ.

It is noted that the defect-detection mask (like that of stage 1550) may be of a resolution that is different, and particularly it may be higher, than that of the inspection image. That is, the mask-segments defined in the area of the mask may be defined in a resolution higher than that of the inspection image.

It is noted that determining of a distribution of parts of the inspection image may also be implemented as part of the segmentation process in stage 1550. For example, method 1500 may include stage 1551 of determining a distribution of each out of a plurality of pixels of the inspection image with respect to one or more of the plurality of mask-segments. According to such an implementation, the segmentizing may be based on the distributions determined for the plurality of pixels. By way of example, the assigning of the various multiple parts of the image to the respective image-segments may be based on the result of the determining of the distribution.

Optionally, the assigning to the image segments is implemented for all of the pixels of the image, or at least for all of the pixels in a majority of the pixels. For example, the determining of the distribution may be carried out for all of the pixels of the image (or for the majority of them), and each of those pixels may be assigned based on the determined distribution. The ways the distribution of each of the pixels may be determined and/or utilized will be clear to a person versed in the art, as they may be similar to those discussed with respect to the distribution in respect to the mask segments (e.g. with respect to stage 1567 and to FIG. 6), mutatis mutandis.

Reverting to FIG. 2, optionally, anchor processing module 1220 may be configured to determine a defect-detection anchor location with respect to the inspection image, based on a matching of a defect-detection template and a portion of the inspection image, wherein an accuracy of the determining of the defect-detection anchor location exceeds a resolution of the inspection image.

Distribution analysis module 1240 may be configured to determine, based on a defect-detection mask which defines different defect-detection segments and on a location determined with respect to the inspection image, a defect-detection distribution of a potential defect with respect to one or more of the defect-detection segments. In such an implementation, defect detection processor 1260 may include a classifier, configured to classify the potential defect based on the defect-detection distribution.

Optionally, distribution analysis module 1240 may be configured to determine a distribution of a potential defect with respect to one or more mask-segments at an accuracy which exceeds the resolution of the inspection image; wherein defect detection processor 1260 is configured to classify the potential defect based on the distribution.

Optionally, distribution analysis module 1240 may be configured to determine a distribution of a potential defect with respect to one or more mask-segments; and defect detection processor 1260 may be configured to classify the potential defect based on the distribution, according to a classification in which classes correspond to defect types whose implications on the operability of the inspected object differ.

FIG. 6 illustrates utilization of a mask 1400 which defines multiple mask-segments 1410 within an area, and inspection image 100. Utilization may be in segmentizing the inspection image 100 based on the multiple anchor locations 1120 (one of which is illustrated in FIG. 6) and on mask 1400, but may also be used to determine the presence of a defect based on an analysis of a potential defect. It is again noted that the utilization of the mask 1400 for segmentation is also illustrated and discussed with respect to FIG. 5.

Area 1110 (hereinafter also simply referred to as "cell" or as "area 1110") is an $X_{cell}$ by $Y_{cell}$ pixels sized area of inspection image 100. It can be seen that while $X_{cell}$ and $Y_{cell}$ may be an integer, the location of the area 1110 does not have to read exactly on the grid of pixels (denoted 102) of the inspection image 100. For example, the best matching between the template and the inspection image may be achieved for an area that is defined in non-integer pixel coordinates. In an additional example, the distance between the location of anchor 1120 and the corresponding area 1110 may be defined in non-integer pixel coordinates.

On the right side of FIG. 6, an upsampled version of area 1110 is illustrated (denoted 1110'), overlapped with a representation of the mask 1400. As can be seen, in the resolution of the inspection image the size of the area 1110 (also referred to as "cell") is 6 by 6 pixels. The size of the upsampled version thereof is 15 by 15 pixels. In the illustrated example, the upsampling of the area 1110 into area 1110' includes increasing the resolution by a factor of N=2.5. It is again noted that while upsampling of a selected cell area may be implemented in some implementations of the invention, it is not necessarily so. As noted above, in some implementations no such cell-area is selected or defined.

If implemented, the upsampling may include a simple linear interpolation. In other implementations, other types of interpolation techniques may be implemented—such as bicubic interpolation, bilinear interpolation, nearest-neighbor interpolation, and so on.

By way of illustration, a single-pixel sized part of the inspection image (denoted 1140) corresponds to an N by N pixels area, denoted 1140', in mask-resolution (if indeed implemented as a raster image), in an example in which a linear interpolation is implemented.

It is noted that while the parts of inspection image which are assigned to image-segments in stage 1550 may be single-pixel sized (as in the example of FIG. 6), this is not necessarily so, and they may also be smaller or larger. If the mask 1400 is used for analysis of a potential defect, it is noted that part 1140 may also represent the location of a potential defect detected during an analysis of the inspection image. Potential defects may likewise possibly be defined as larger or as smaller than a single pixel.

The different mask-segments 1410 of the mask 1400 are illustrated as defined in a sub-pixel resolution. This may be implemented for example in a vectorial representation of the mask. It should be noted that in some implementations, mask-segments 1410 of the mask may be defined only in resolution of whole pixels—e.g. if the mask is defined as a raster image. Different mask-segments of the mask 1400 are enumerated in FIG. 6 as 1410(13), 1410(14), 1410(15), and 1410(16). The areas denoted 1410(10) may be defined in the mask as segments (thereby having the segments covering the entire area), or not be defined at all (thereby having the segments covering the area only partially).

Referring to the example of FIG. 6, stage 1550 includes assigning each part 1140 out of multiple parts of the image (other parts not shown) to a respective image-segment selected out of a multiple image-segments, wherein the multiple image-segments correspond to at least one mask-segment 1410 of mask 1400. This may be implemented, for example, by determining a distribution of the respective part 1140 with respect to one or more of the mask-segments 1410.

Referring to the example of FIG. 6, it is noted that a relationship between the mask-segments 1410 and the part 1140 may be facilitated by knowledge of a relationship between the location of anchor 1120 and at least one reference point of the mask 1400 (this is illustrated by arrow 1122, and may be part of the reference data) and knowledge of a relationship between the location of anchor 1120 and at least one reference point on the part 1140 (this is illustrated by arrow 1124, and may be determined since both anchor location and the location of the identified item may be defined in coordinates of the inspection image 100).

It can be seen that the area 1140' (which is an enlarged analogue of part 1140 of the inspection image) is distributed between mask-segments 1410(10), 1410(13) and 1410(16) of the mask 1400. As aforementioned, the size of the part 1140 may also be more or less than one pixel. Accordingly, the part 1140 may be associated with location information and possibly also size information and/or grade.

It should be noted that the determining of the distribution may include determining the distribution at an accuracy which exceeds the resolution of the template, of the inspection image, and/or the accuracy in which the mask is defined. This enables, inter alia, to provide the segmentation based on high resolution rules, while not requiring an increase of the resolution of the scanning.

In the example of FIG. 7, the size of the part 1140 in the inspection image is not a single pixel (as in the example of FIG. 6), but rather four pixels. The upsampled analogue of part 1140 is area 1140'. Area 1140' is illustrated as divided into four quarters, but this is done for illustratory reasons only, and, as aforementioned, the determining of the distribution is done in a higher resolution.

As can be seen, slightly more than half of area 1140' overlaps with mask-segment 1410(17), and slightly less than half overlaps mask-segment 1410(18). This is reflected by the determined distribution (denoted 1900) in which segment type 1 (which corresponds to mask-segment 1410(18)) receives a score of just under 2, and segment type 2 (which corresponds to mask-segments 1410(17)) receives a score of just over 2. In the given example, the scores in the distribution are given in units equal to the original pixels of the inspection image, but a person who is of skill in the art would understand that any other method of determining the distribution may be implemented. For example, the distribution may be determined in percents, in pixels (usually a fractional quantity), in nanometers, and so on, wherein such definition would usually be similar to that in which the classification logic was defined.

It is noted that while the area 1140' that corresponds to part 1140 may be distributed between multiple mask-segments 1410 of the mask 1400, this is not necessarily the case, and the entire area may correspond to a single mask-segment 1410.

Referring to method 1500 as a whole, it may include—e.g. at stage 1530—correlating areas of a runtime inspection image of a wafer to a template (this stage is also referred to as "template anchoring"). Based on this correlation, areas of the inspection image are selected and may later be further processed to provide areas which correspond to the mask.

While the determining of the mask may be a relatively long process, as it may serve for runtime inspection of many inspected wafers (or any other inspected objects)—the runtime inspection in such a scenario should be relatively quick (because it is repeated many times). In order to achieve this rapidity, the inspection may be carried out in a relatively low resolution.

It should be noted that while providing additional information useful for the segmentation process, method 1500 does not necessitate any increase in the runtime inspection time, and that while it may provide information in sub-pixel accuracy, it does not require any reduction of the runtime inspection pixel size.

It is noted that while some of the examples above pertain to electron beam scanning, the disclosed techniques may also be implemented for other types of inspection or imaging (e.g. optical, Radar, sonar, etc.). Likewise, while some of the examples above pertain to inspection of an electronic circuit such as wafers, the disclosed techniques may also be implemented for other types of inspection objects, whether in the nanometric scale or in other scales.

As mentioned above, the template and the mask utilized in method 1500 may be created in different ways. For example, the mask may be determined based on a reference image of an inspected-object reference area. The method in such a case, as will be discussed below, may include downsampling at least a portion of the reference image to provide the template which has a lower resolution. It is noted that apart from downsampling, the generating of the template may also include additional types of image processing.

It should be noted that the reference image used in the process of making the mask and/or the template may also used for comparison and defect detection in stage 1560. However, in other implementations one (or more) reference images are used for the generation of reference data (including the mask and/or the mask), and another reference image (or several) are used at the stage of determining the presence of the defect based on the segmentation.

For example, the mask and/or the template may be generated once from a high resolution reference image of a single die in a wafer (e.g. as discussed with respect to FIGS. 8 and 9), and the same reference data may be used for defect detection in multiple other wafers. Continuing the example, in each of those other wafer defect detection may be based on comparison of a respective inspection image of a first die of that wafer to a corresponding reference image of another die of that very same wafer.

The inspected-object reference area may be a part of the same inspected object (e.g. another die in the same wafer), or may belong to another inspected object (e.g. another wafer of the same batch, or of another batch). The reference image in such a case may be generated by the same inspection machine used for the obtaining of the inspection image of method 1500. In another implementation, the reference-image may be generated from computer-aided design (CAD) data. Optionally, the method may include generating the template and/or the mask by processing one or more reference images generated from computer-aided design (CAD) data.

The creating of the mask and/or the template used in method 1500 may be carried out according to the process of method 1600. It is noted that this process may be a part of method 1500 (that is—method 1600 may be incorporated into method 1500). According to an embodiment of the invention, the mask is determined based on a reference image of an inspected-object reference area, wherein method 1500 further includes generating the template, wherein the generating includes downsampling a part of the reference image. It is noted that in other implementations the reference image is not an inspection image, but is rather generated from computer-aided design (CAD) data.

Figure 8:
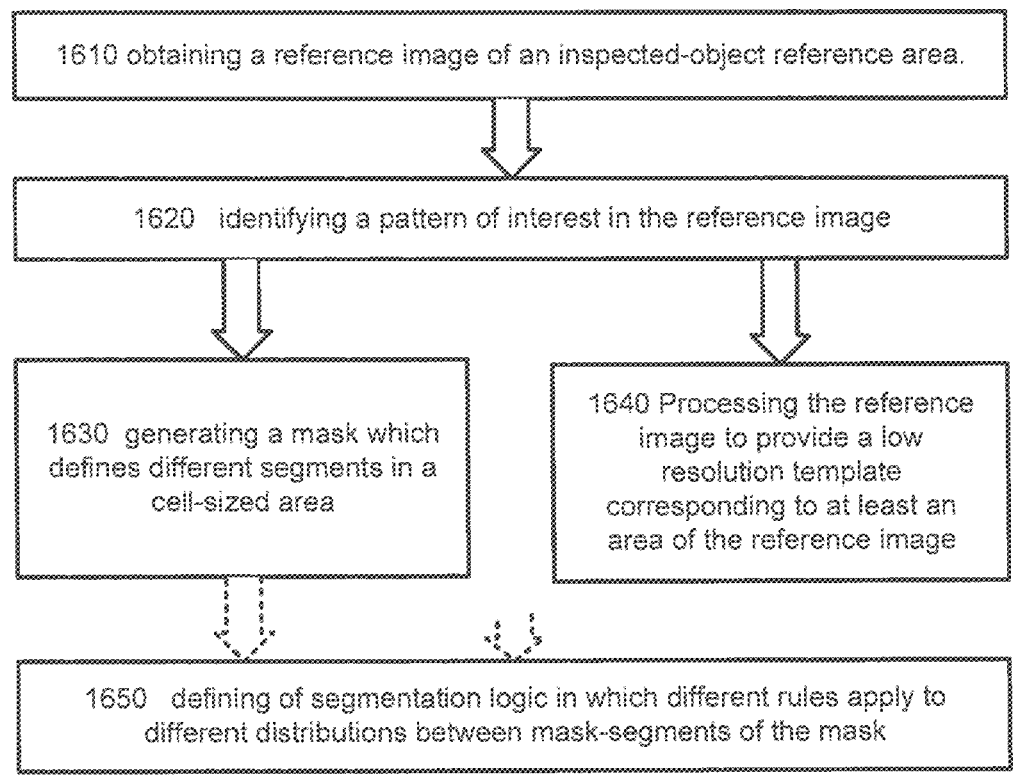
FIG. 8 illustrates a method for generating reference data that may be used for segmentation, according to an embodiment of the invention.

FIG. 8 illustrates method 1600 for generating reference data that may be used for segmentation (e.g. as in method 1500), according to an embodiment of the invention.

Method 600 starts with stage 1610 of obtaining a reference image of an inspected-object reference area. If the reference image is an image of an actual object (and is not based on CAD data, for example), a high resolution image of the reference object (which may be selected from a group consisting of an electronic circuit, a wafer, and a photomask, but not necessarily so) may be obtained—either by direct scanning, inspecting, etc., or by receiving the same from another system. The high resolution image may include imaging data of the entire reference object, or just of the reference area. Referring to the examples set forth in the previous drawings, stage 1610 may be carried out by an inspection results interface such as inspection results interface 1204, or by an inspection machine such as inspection machine 1210.

For example, the high resolution reference image may be an image of a die, or of a part of a die. The high resolution reference image may be gathered from a high-resolution inspection process and/or from a computer-aided design (CAD) file. By way of example, if the high-resolution image is gathered by increasing resolution on the e-beam inspection tool or by using a SEM imaging system.

Once the high-resolution image is obtained, it may be used for the definition of information which may later be used in the actual classification of detected possible defects. Method 1600 may continue with stage 1620 of identifying a pattern of interest in the reference image. Such a pattern of interest is also referred to as a "Golden Cell". Such a pattern of interest may be identified by a person or may be automatically generated. It is noted that such a pattern or "Golden Cell" may be repeated multiple times in the inspection image (possibly in a periodical recurrence pattern), but this is not necessarily so. Referring to the examples set forth in the previous drawings, stage 1620 may be carried out by an image processing module such as image processing module 1230.

Stage 1630 of method 1600 includes generating a mask which defines different mask-segments in a cell-sized area. In the case of a reference image that includes a repeating pattern, the size of the cell may be substantially similar to that of the repeating pattern (or to a sub-area thereof, e.g. one which is defined as the pattern of interest in stage 1620). It is noted that in some implementations, the size of the mask may be smaller than that of the repeating pattern (possibly significantly so) or larger than the size of the repeating pattern). Referring to the examples set forth in the previous drawings, stage 1630 may be carried out by a mask generation module such as mask generation module 1290 of system 1200.

Within the mask, different mask-segments are defined. Such different mask-segments may be defined for different reasons. For example, mask-segments may be defined to correspond to different functionalities of the electronic circuit (or other item) at the corresponding area or other areas of interest within the Golden Cell pattern. In another example, mask-segments may be defined to correspond to different susceptibility to defects. The number of mask-segments defined in the mask may be different for different inspected objects (e.g. for different electronic circuits), and may be different depending on the usefulness of segmentation of inspection images based on such mask-segments to the detection and/or analysis of defects at a later time.

For example, while in some implementations the number of distinct mask-segments in the mask may be three, five, or eight, in other implementations dozens and even hundreds of mask-segments may be defined. The defining of the mask-segments may be carried out by a person or by a computer (e.g. based on CAD data).

It should be noted that if indeed the mask is generated in a resolution higher than that which is later used for the runtime inspection in method 1500, the mask-segments of the mask are defined in stage 1630 at a relatively high resolution (e.g. at the resolution of the high-resolution reference image). While in some implementations the mask-segments defined in the mask are non-overlapping and cover between them the entire area of the mask, this is not necessarily so and some areas of the mask may not belong to any segment.

It should be noted that while the runtime inspection in method 1500, in which parts of an inspection image are segmentized, may be carried out in a relatively lower resolution (e.g. having a pixel size corresponding to x2, x3 or more the high resolution pixel size), the utilization of a high resolution mask (together with upsampling of part of the inspection image) enables segmentation of such inspected image parts based on their locations in relation to the higher-resolution mask—which is far more exact.

If indeed the resolution of the reference image is higher than that of the inspection image used in method 1500, method 1600 may further include stage 1640 of processing the high-resolution reference image to provide a lower resolution template corresponding to at least an area of high-resolution image. Apart from downsampling at least a part of the reference image, the generating of the template may include implementation of additional image processing techniques such as softening, smoothing, edge enhancements etc. According to an embodiment of the invention, this step is mandatory if the mask is defined on a resolution that differs from the inspection resolution used for the generating of the inspection image of method 1500. Referring to the examples set forth in the previous drawings, stage 1640 may be carried out by an image processing module such as image processing module 1230 of system 1200.

The processing of stage 1640 may be implemented by a decimation image processing algorithm or other down-sampling algorithm, but this is not necessarily so. The template (also referred to as "lower resolution reference image") may be used for detection of the recurring pattern (e.g. by identifying a part of it, an anchor) in a run-time inspection image, and therefore for determining a spatial correlation between the mask and the run-time inspection image.

Optionally, the resolution of the template may be lower than that of the mask (and of the high-resolution image), and corresponds to the intended run-time inspection resolution. More than one template may be generated, e.g. in different lower resolutions—to be used in different runtime inspection resolutions. By way of example, the resolution of the template may have a pixel size (height or width) corresponding to 100 nm while the mask resolution may have a pixel size corresponding to 70 nm. An example of a processing of part of the high-resolution reference image to provide a lower resolution template is exemplified in FIG. 9.

The ratio between the 1-D pixel dimension between the template and the mask may differ in various implementations of the invention (e.g. 1:2, 1:4, 1:7, 1:15, etc.). It is noted that the ratio between the corresponding pixel areas is a second power of that ratio (e.g. 1:4, 1:16, 1:49, etc.).

Method 1600 may further include stage 1650 of defining of segmentation logic in which different rules apply to different distributions between mask-segments of the mask. The defining of the segmentation rules may depend on the specific mask defined, but not necessarily so. For example, the segmentation rules may be defined based on the relative portion covered by each of the mask-segments in the mask. Alternatively, the segmentation rules may be irrespective of the specific mask, and be defined (as part of method 1600 or otherwise) based on other considerations—such as the physical characteristics represented by each of the mask-segments.

Any stage of method 1600 may be carried out by a person (especially using a computer), by a computer or other machine, and/or by a combination thereof.

Figure 9:
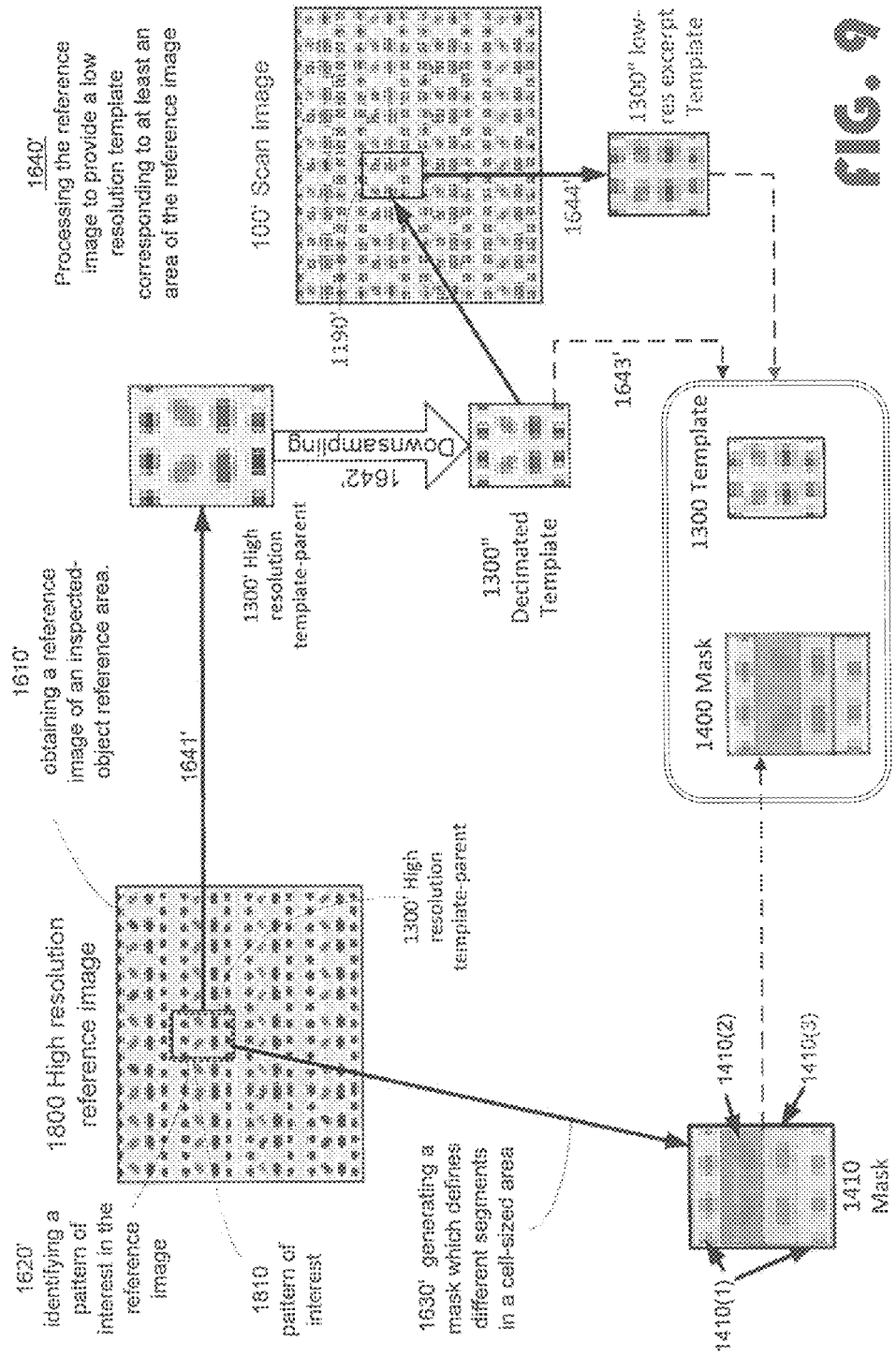
FIG. 9 illustrates a process for generating reference data that may be used for segmentation, according to an embodiment of the invention.

FIG. 9 illustrates a process 1600' for generating reference data that may be used for segmentation (e.g. as in method 1500), according to an embodiment of the invention. Especially, process 1600' may be used for the generation of a mask 1400 and a template 1300.

The stages denoted with an apostrophe (e.g. 1610', 1620', etc.) are possible implementations of the corresponding stages of method 1600 (e.g. stages 1610 and 1620 respectively).

Referring to stage 1640' of processing the reference image to provide a low resolution template corresponding to at least an area of the reference image, it is noted that it may be implemented in several ways, some of which are illustrated.

Firstly, a high resolution template-parent 1300' is selected from the reference image 1800. The selection is denoted 1641'. The high resolution template-parent 1300' may be identical to selected cell-sized pattern of interest area 810, or different therefrom. The high resolution template-parent 300' is then decimated or otherwise downsampled or manipulated—e.g. by applying morphological image processing techniques such as smoothing or edge enhancement (denoted 1642'), to provide lower-resolution template 1300" (also denoted "downsampled template" and "decimated template"). This template 1300" may optionally be used "as is" as the template provided (this option denoted 1643').

In another implementation (denoted 1644'), the downsampled template 1300" is used for selecting from a lower resolution image 100' (e.g. in the resolution in which the inspection image of method 1500 is obtained) an area 1190' that matches the downsampled template 1300", and using that area 1190' as the template 1300.

Reverting to system 1200 and to method 1500 as a whole, it is noted that utilization of system 1200 and/or of method 1500 may be implemented to enable ultra-fine pattern-based segmentation, which in turn facilitates better control of the defect detection process and of the analysis thereof.

It will also be understood that the system according to the invention may be a suitably programmed computer. Likewise, the invention contemplates a computer program being readable by a computer for executing method 1500 and its variations. Likewise, the invention contemplates a computer program being readable by a computer for executing method 1600 and its variations. The invention further contemplates a machine-readable memory tangibly embodying a program of instructions executable by the machine for executing method 1500 and/or method 1600.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. An analysis system for detection of defects within an inspection image of an inspected object, the inspection image comprising multiple image parts, the system comprising:
    a computerized anchor processing module configured to obtain multiple anchor locations with respect to the inspection image;
    a computerized segmentation module operatively coupled to the computerized anchor processing module, configured to segmentize the inspection image, the segmentizing comprising:
        based on the multiple anchor locations, associating each given image part with one or more mask-segments of a segmentation mask, wherein the segmentation mask represents a pattern of interest and the mask-segments represent areas of interest within the pattern of interest;
        for each given image part, using the one more more mask-segments associated with the given image part for assigning the given image part to a respective image segment, assigning to be provided in accordance with predefined segmentation rules which define correspondence between mask-segments and image segments; and
    a defect detection processor operatively coupled to the computerized segmentation module, configured to determine a presence of a defect in a given image part of inspection image at least by assessing each pixel in the given image part based on: (a) a result of a comparison of the given image part to correlative data of a reference image, and (b) a decision rule which depends on the image-segment assigned to the given image part.

2. The system according to claim 1, wherein the anchor processing module is configured to compute the multiple anchor locations based on a matching of a template to multiple portions of the inspection image.

3. The system according to claim 2, wherein the system further comprises a reference data generator configured to downsample at least a part of a reference image of an inspected-object reference area, and to generate the template based on a result of the downsampling.

4. The system according to claim 2, wherein the system further comprises a reference data generator which is configured to generate the mask by processing a reference image which is generated from computer-aided design (CAD) data.

5. The system according to claim 1, further comprising a reference data generator which is configured to generate the mask by processing a reference image which is generated from CAD data.

6. The system according to claim 1, wherein at least two of the image parts are at least partly overlapping.

7. The system according to claim 1, wherein the inspected object is selected from a group consisting of an electronic circuit, a wafer, and a photomask.

8. The system according to claim 1, wherein the anchor processing module is configured to compute the anchor locations at an accuracy which exceeds a resolution of the inspection image.

9. The system according to claim 1, wherein the processor is further configured to define different detection schemes to different areas of the inspection image based on the segmentation of at least the part of the inspection image; wherein the defect detection processor is configured to determine the presence of the defect based on a result of the defining.

10. The system according to claim 1, wherein the defect detection processor is configured to classify a potential defect in a given image part based on an image-segment assigned to the given image part, wherein classes in a classification to be used correspond to defect types whose implications on an operability of the inspected object differ.

11. The system according to claim 1, further comprising a sensor that is configured to inspect the inspection object and to provide the inspection image based on the inspection.

12. A computerized method for detection of defects within an inspection image of an inspected object, the image comprising multiple image parts, the method comprising:
    obtaining multiple anchor locations with respect to the inspection image;
    segmentizing the inspection image, the image segmentizing comprising:
        based on the multiple anchor locations, associating each given image part with one or more mask-segments of a segmentation mask, wherein the segmentation mask represents a pattern of interest and the mask-segments represent areas of interest within the pattern of interest;
        for each given image part, using the one or more mask-segments associated with the given image part for assigning the given image part to a respective image-segment, assigning provided in accordance with predefined segmentation rules which define correspondence between mask-segments and image segments; and
    determining a presence of a defect in a given image part of the inspection image, the determining of the presence of the defect comprises:
        for each pixel in the given image part, assessing the pixel based on: (a) a result of a comparison of the pixel to correlative data of a reference image, and (b) a decision rule which depends on the image-segment assigned to the given image part.

13. The method according to claim 12, wherein the obtaining comprises computing the multiple anchor locations based on a matching of a template to multiple portions of the inspection image.

14. The method according to claim 12, wherein the determining of the presence of the defect is based on different detection schemes defined for different areas of the inspection image, wherein the defining is based on the segmentation.

15. The method according to claim 12, further comprising generating the mask by processing a reference image which is generated from CAD data.

16. A program storage device comprising a non-transitory computer readable storage medium storing computer readable program code embodied therein for causing a computer to perform a method for classifying a potential defect identified within an inspection image of an inspected object, the method comprising the steps of:
   obtaining multiple anchor locations with respect to the inspection image;
   based on the multiple anchor locations and on a mask which defines multiple mask-segments, segmentizing the inspection image by assigning each part out of multiple parts of the inspection image to a respective image-segment selected out of a multiple image-segments, wherein the multiple image-segments correspond to at least one mask-segment of said multiple mask-segments; and
   determining a presence of a defect in the inspection image based on the segmentation, the determining of the presence of the defect comprises:
   for each pixel out of a plurality of pixels of the inspection image, assessing the pixel based on: (a) a result of a comparison of the pixel to correlative data of a reference image, and (b) a decision rule which depends on the image-segment selected for the pixel,
   wherein the determining of the presence of the defect is based on different detection schemes defined for different areas of the inspection image, wherein the defining is based on the segmentation.

17. The non-transitory computer readable storage medium according to claim 16, wherein the obtaining comprises computing the multiple anchor locations based on a matching of a template to multiple portions of the inspection image.

18. The non-transitory computer readable storage medium according to claim 16, wherein the method further comprises generating the template, wherein the generating comprises downsampling at least a part of a reference image of an inspected-object reference area.

19. An analysis system for detection of defects within an inspection image of an inspected object, the inspection image comprising a plurality of pixels, the system comprising:
   a computerized anchor processing module configured to obtain multiple anchor locations with respect to the inspection image;
   a computerized segmentation module operatively coupled to the computerized anchor processing module, configured to segmentize the inspection image based on the multiple anchor locations and on a mask which defines multiple mask-segments, by assigning each part out of multiple parts of the inspection image to a respective image-segment selected out of a multiple image segments, wherein the multiple image segments correspond to at least one mask-segment of said multiple mask-segments; and
   a defect detection processor operatively coupled to the computerized segmentation module, configured to determine a presence of a defect in the inspection image based on the segmentation at least by assessing each pixel out of a plurality of pixels of the inspection image based on: (a) a result of a comparison of the pixel to correlative data of a reference image, and (b) a decision rule which depends on the image-segment selected for the pixel,
   wherein the processor is further configured to define different detection schemes to different areas of the inspection image based on the segmentation of at least the part of the inspection image; wherein the defect detection processor is configured to determine the presence of the defect based on a result of the defining.

* * * * *